Sept. 16, 1969   A. C. PALATINUS   3,467,866
COMPOSITE INTERMODULATION SPECTRA SIGNATURE RECORDER
Filed Aug. 31, 1966   11 Sheets-Sheet 9
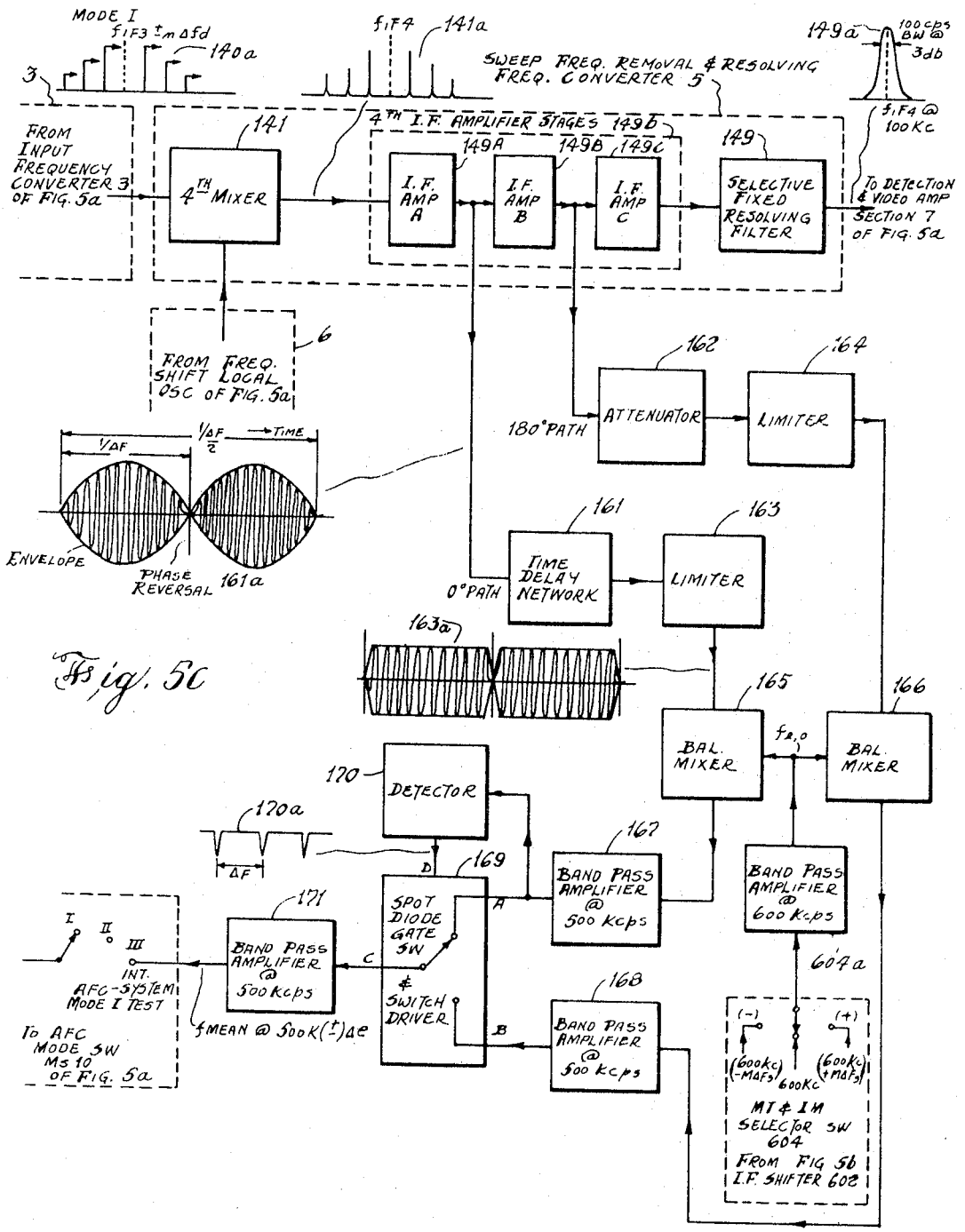

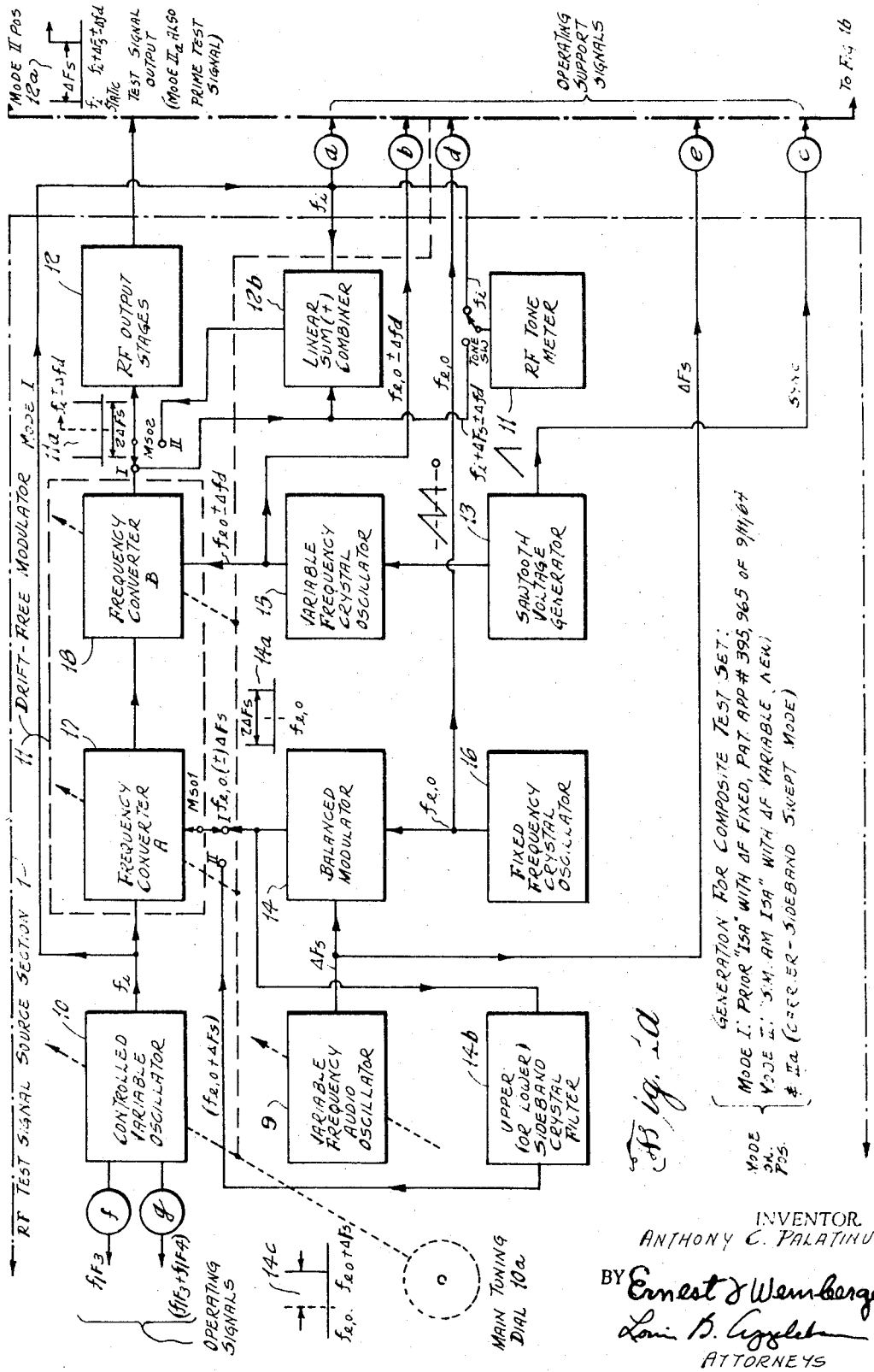

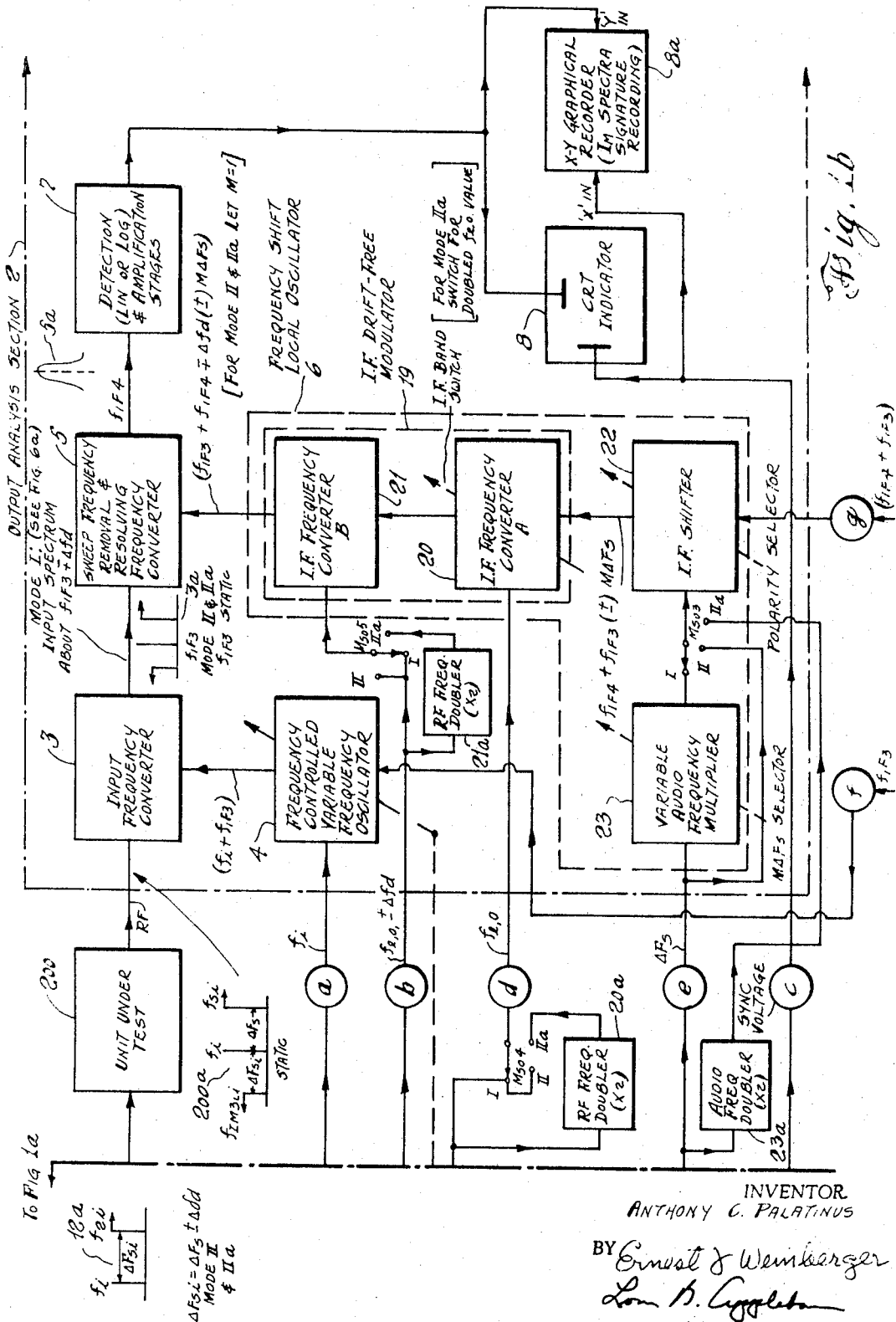

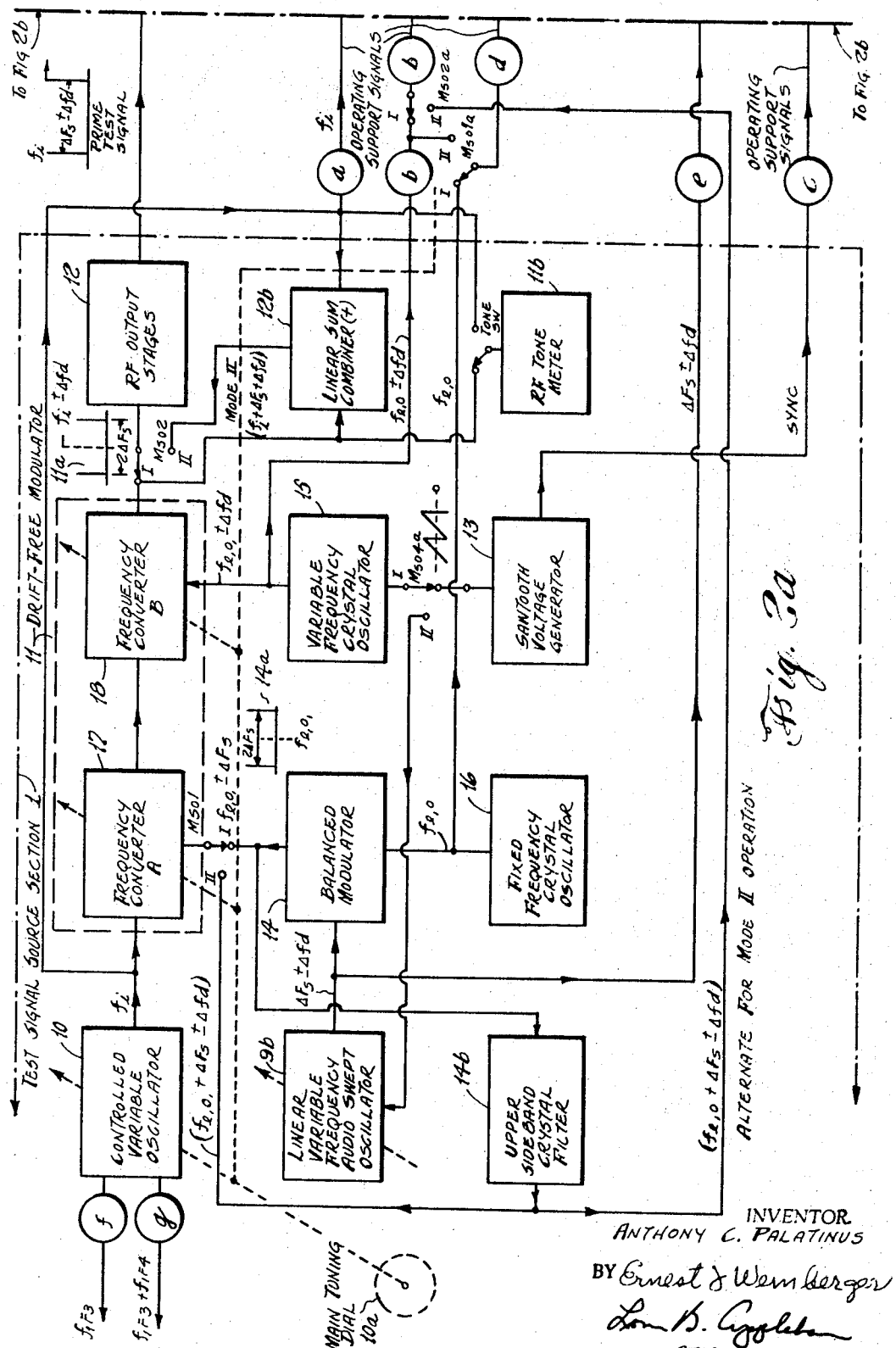

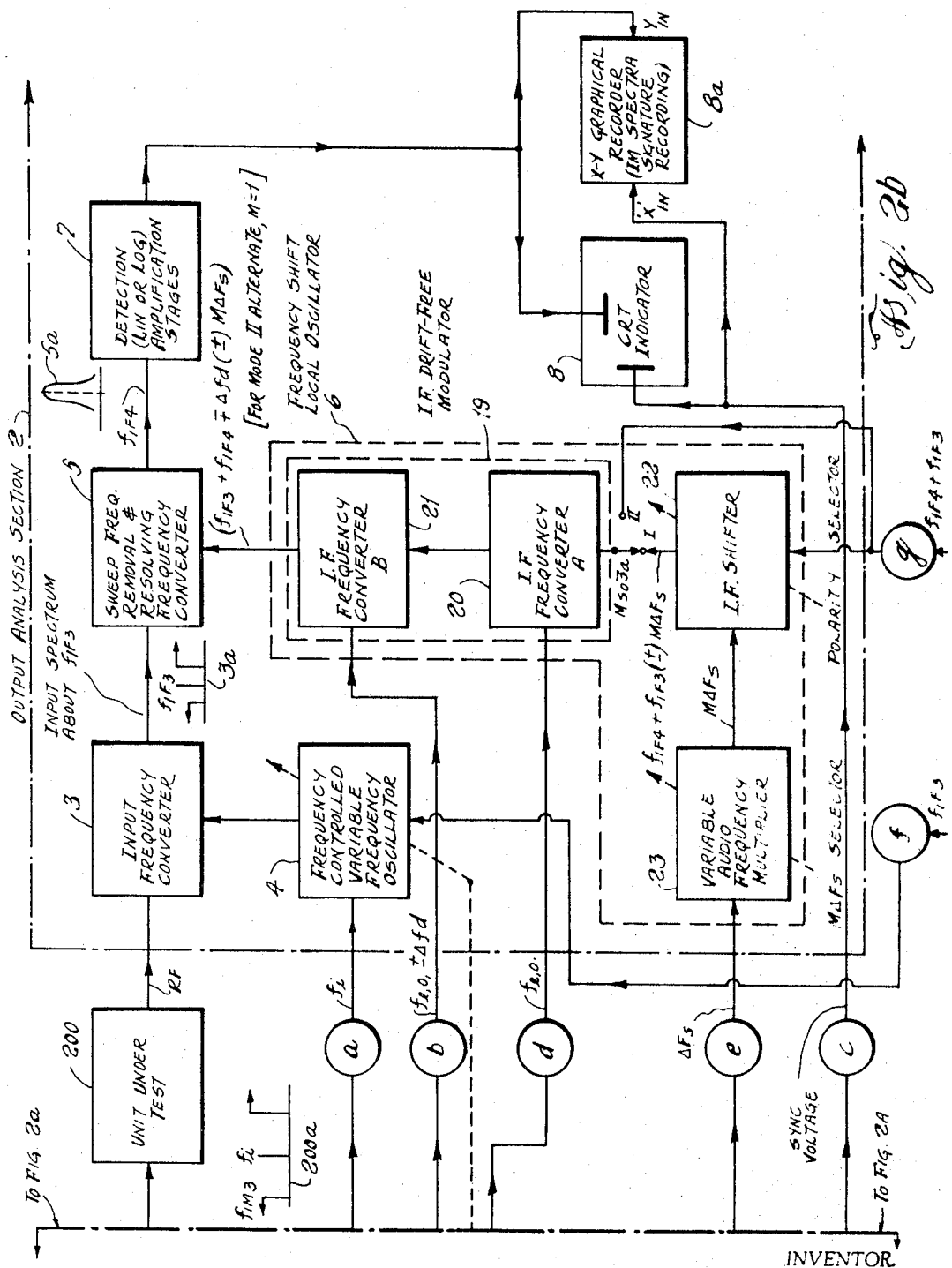

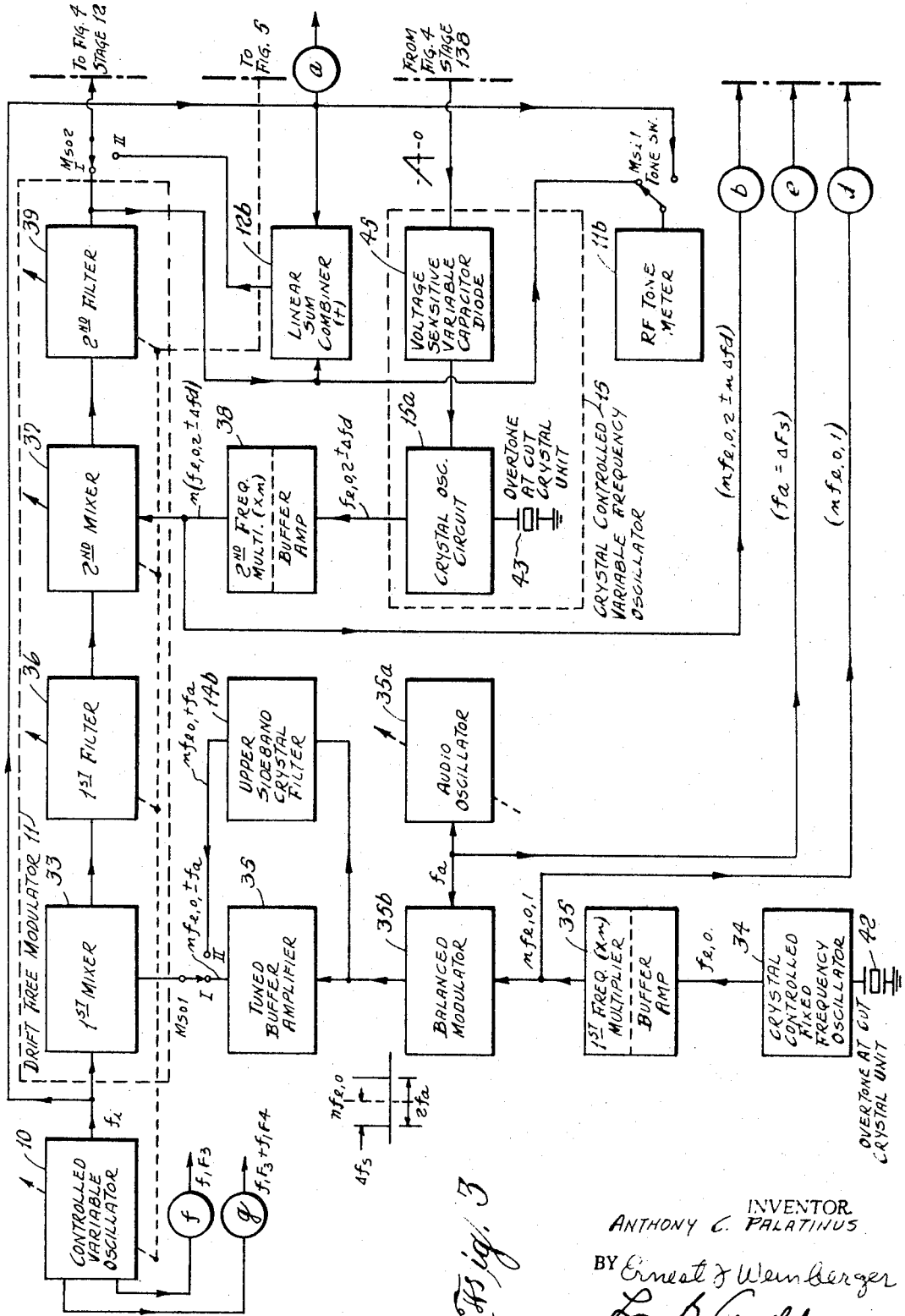

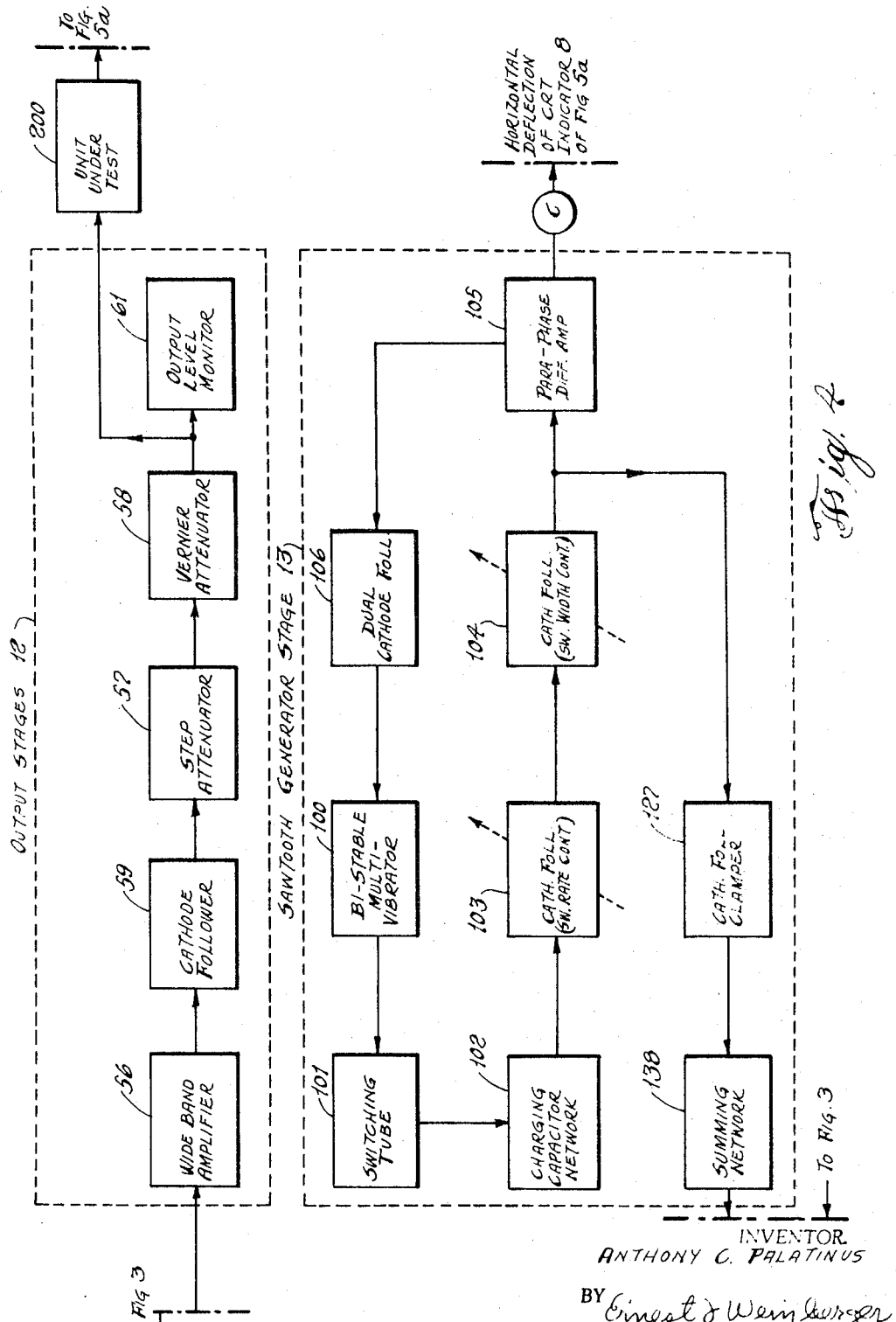

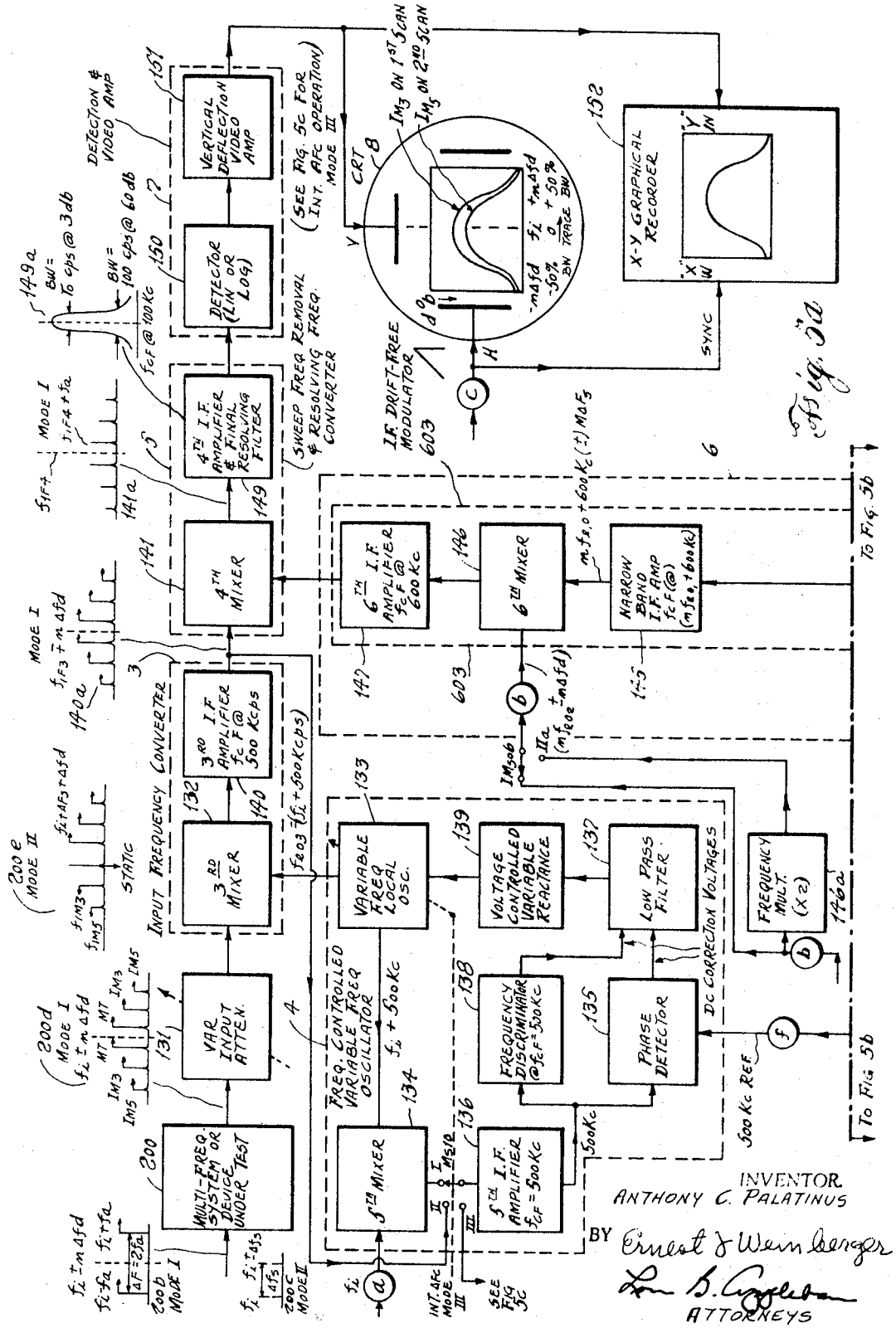

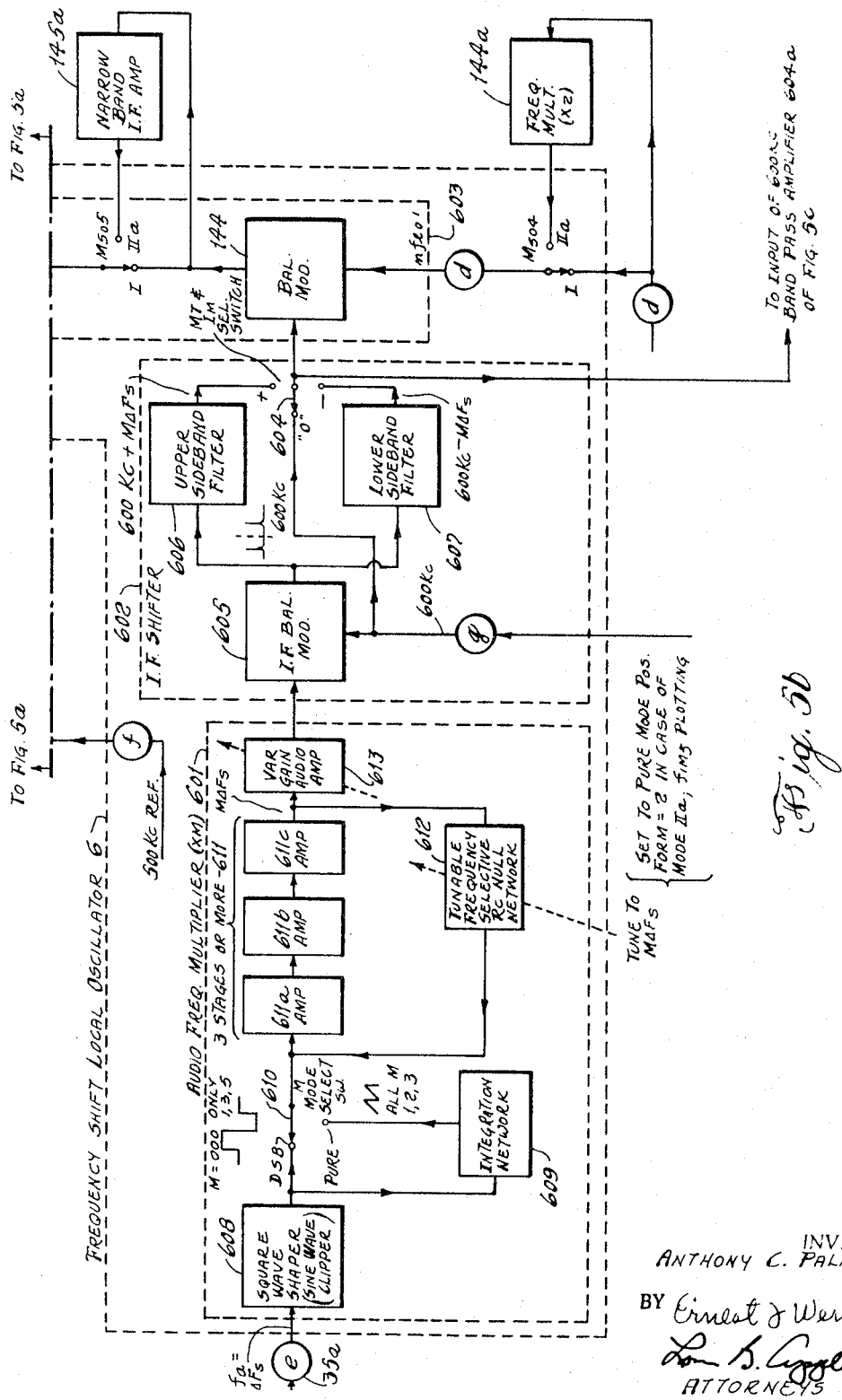

United States Patent Office 3,467,866
Patented Sept. 16, 1969

3,467,866
COMPOSITE INTERMODULATION SPECTRA SIGNATURE RECORDER
Anthony C. Palatinus, Maspeth, N.Y.
(15 Rooney Court, Glen Cove, N.Y. 11542)
Continuation-in-part of application Ser. No. 395,965, Sept. 11, 1964. This application Aug. 31, 1966, Ser. No. 576,789
Int. Cl. H04b 1/16, 1/36
U.S. Cl. 325—67
8 Claims

ABSTRACT OF THE DISCLOSURE

Circuit and method for the measurement and the automatic recording, in a sequential manner of the intermodulation distortion characteristics of a network under test responding to a two-tone frequency swept signal that maintains one-tone static and provides linear variation of frequency separation between the tones. The distortion plotting technique is implemented by a test set that comprises a two-tone "carrier-sideband swept" signal generation source which simultaneously supplies operating signals to an output response analysis recorded. One operating signal is a sweep frequency carrier wave representative of the frequency deviation of the swept frequency tone of the two-tone "carrier-sideband swept" test signal. The latter signal is supplied to a resolving frequency conversion operator which frequency offsets its location in a manner that negates the sweep frequency excursion of the main or third intermodulation distortion term most adjacent to the static tone of the response output from the network under test. This sweep frequency removal action results in the selective filtering of a static third odd order intermodulation distortion product. A second operating signal representative of the two-tone quiescent frequency separation or a harmonic multiple thereof, in conjunction with the multiplication of the frequency deviation amount of the first operating signal, produces successive frequency offsetting steps of the sweep negating action. The two-tone and their intermodulation distortion products sequentially coincide with the resolving passband, and the response component is detected and synchronously displayed.

The invention described herein may be manufactured and used by or for the Government of the United States of America for governmental purposes without the payment of any royalties thereon or therefor.

Cross-reference to related application

This application is a continuation-in-part of my copending application entitled "Intermodulation Spectrum Analyzer," Ser. No. 395,965, filed Sept. 11, 1964 and now Patent No. 3,411,079 of Nov. 12, 1968.

The present invention relates generally to methods of continuous measurement and evaluation of the linearity of the transfer function of various electrical devices and more particularly to such evaluation and measurement of entire electrical systems of multifrequency operation. This invention further relates to the generation of non-stationary test signals, and also to frequency stabilization techniques of an automatic nature operating in the art of two frequency signal engineering. In addition, the invention concerns spectrum analysis and response display indication of intermodulation distortion characteristics over the bandpass region of narrow bandwidth devices or systems. In particular, the invention refers to the determination in an automatic manner of the distortion component content of the spectrum output resulting from the response of a multi-frequency system, such as sideband transmission systems, to non-stationary two tone test signals of either constant frequency separation linearly varying in time over a selected frequency band, or linearly varying frequency separation with one tone held constant. More specifically, this invention embodies intermodulation spectrum signature techniques directed towards systems measurements, thereby leading to the graphical traceout display and recording of the intermodulation distortion response characteristics of linear type communications systems.

It is a special interest of the present invention to involve automatic control operations for the precise and stable frequency translation of the sweeping test response spectrums resulting from such a two tone type scanning test signal about a pre-determined I.F. frequency reference value at which intermodulation spectrum analysis takes place.

The present invention further locates in the metrology of electro-magnetic compatibility (EMC) relating therein to methods of intermodulation spectra signature recording in an automatic manner.

In this instant invention the subject intermodulation spectrum analyzer of my copending application is uniquely enhanced to implement the derived generation technique herein described as a carrier-swept sideband type two tone RF test signal, wherein one tone frequency remains static and the other tone frequency is made non-stationary such that the audio frequency separation value between the two equal amplitude frequency signals linearly varies with time. In addition, this invention further discloses a likewise advanced and significantly differing test signal response output measuring method and apparatus to accomplish the determination of the degree of non-linear distortion of a narrow band RF device or stage under test over a selected portion of its frequency band.

In essence, the novel signal generation as produced in my copending application supplies a swept-in-step two tone type test signal that represents a composition of dual tracking, frequency controlled variable frequency signals of equal amplitudes which maintains therebetween a fixed frequency separation interval throughout a sweeping frequency excursion. The formulation of a test set allows a selectable number of rapidly repeatable scanning operations of both fixed and time varying frequency separation values between two tones, and at various drive levels. The subsequent informative recording of the output response analysis data is indicative of the "intermodulation spectra signature" of the device under test.

Prior art point measurement techniques require the resolving of frequency swept energy and this often results in the CRT display becoming difficult to visually interpret. Accordingly, a number of point measurements must be made to obtain sufficient information on the unit or system linearity characteristic. Where highly selective measurements are to be made, common "ringing" distortion of the resolving filter must be avoided; thus resulting in lengthy sweep test time and loss of persistence in the visual traceout. The limits and faults of prior art methods of static testing are found in the singularly capability of resolving non-frequency swept spectrum responses to constant frequency difference test signal. This present invention totally removes any such inflexibility by advancing a new complementary method of RF intermodulation distortion plotting within a composite test set by alternative usage of similarly operative stages (but significantly differing signal processes than my aforementioned application), and automatically functioning as an applicable "intermodulation spectra signature recorder" for EMC/RFI evaluations. Test signal stability is necessary since operation at the upper high frequency region of say 30M c.p.s., (or 30 mHz. where Hz. or hertz replaces cycle per second), a little frequency jitter affects full amplitude response of a highly selective 3 db resolving filter. As for example in conventional prior art spectrum analysis, with a 3 db bandwidth of say 150 c.p.s., then 30 c.p.s. stability out of 30M cs. or 1 part in 1 million results in vibration in amplitude of 10%.

The basic distortion problems and the drawbacks of prior art IM spectra signature techniques or the like have been well delineated in my copending application. Clearly, this problem has reached important dimensions since RF transponders used in vehicle tracking systems are expected to operate linearly under multiple signal conditions. Observe that the term, spectra signature implies that each unit responding to test, will be slightly different from the other like units, and most probably the test spectrum results as a function of their operational environment. Note most recently, as reported in IEEE Transactions on Microwave Theory and Technique, vol. MTT-13, No. 6, November 1965 by S. M. Perlow and B. S. Perlman, in their article "A Large-Signal Analysis Leading to Intermodulation Distortion Prediction in Abrupt Junction Voractor Upconverters," pp. 820–827; a uniquely determined relationship exists between the amplitudes of two tone type IM distortion components and the non-linear gain characteristics wherein the gain is a function of input signal level and the non-linear (sq. law) transfer function is responsible for gain saturation.

A faster testing approach in the EMC/RFI field is thus found to be of first importance and a need develops for automatic electromagnetic spectrum scanning and plotting equipment to reduce test time with the valued desirability of producing X–Y chart recordings.

As may be reasoned from the above referenced technical paper, utilizing rapid and repeatable apparatus to obtain evaluation of environment-generated intermodulation spectra in communication complexes is effective in the quantitative analysis required of signature type data.

Realization of the clear value attained from the resultant operational technique founded upon the innovations originating herein comes into sharper focus in the light of a newly accomplished investigation reported in "IEEE Transactions on Communications Technology," August 1966 volume, in a technical paper "Response of an AGC Amplifier to the Narrow Band Input Signals," authored by W. J. Gill and W. K. S. Leong, pages 407–417.

The response analysis made therein demonstrates that the characteristics of weak signal suppression and of cross-product generation exhibited by linear type automatic gain control (AGC) systems are functionally related to the input signal and the frequency separation (or spacing) of two narrow band input signals.

This measurable relationship determined from the designated variables equally extends and directs itself to encompassing two tone input signals; which stands presented herein as being but a representative special example case thereof. Hence in total power level control, undesirable interaction occurs between the two signals dependent upon the time constant and frequency separation values whereby weak signal suppression and cross-product generation decreases with increasing frequency separation. The example pair of observed response properties as referenced from the two forestated publications, manifests the scope acquired with the making available of this instant invention. In view of the foregoing, the automated recording of such example type characteristic effects results with prediction of a system's performance and the application of required RFI reduction techniques.

It is the broad objective of this invention to provide the duality of automatic electromagnetic spectra signature scanning and plotting equipment suitable for linearity test and in the test area of the national problem of EMC/RFI evaluations. Hence, one object of this invention is to present the means and method for investigation and evaluation of environment generated non-linear distortion and intermodulation spectra in communications complexes.

Still another object is to incorporate a new and equally useful capability of RF intermodulation spectra signature recording in an automatic manner, whereby a unique carrier-swept sideband or "Simulated AM" method of test may be accomplished. It uses a multi-mode combinational test set functioning as a composite intermodulation spectra signature recorder that likewise readily implements the plotting technique of intermodulation spectrum analysis first established in my aforementioned co-pending patent application entitled "Intermodulation Spectrum Analyzer," Ser. No. 395,965 filed Sept. 11, 1964, now Patent No. 3,411,079.

An object is to provide methods and overall apparatus for the rapid and repeatable determination of the intermodulation distortion characteristics of RF devices or systems on a selected IM component term output response X–Y plotting basis over the frequency region of interest during a scan cycle of the test system; with the recorded results serving as indicative of unit under test's intermodulation spectra signature.

Another object of this invention is to provide a systematic method and test set for the frequency response plotting of RF intermodulation distortion components in a drift-free manner governed by frequency synthesis control over a wide frequency range of operation.

It is not difficult to appreciate that these objectives are not easily achieved. However, in accord with the principles of this present invention, the newly disclosed and significant signal process techniques reveal unexpected results whereby the above stated goals are thereby attained.

Other objects and advantages will clearly appear from the following description of two example embodiments of the invention, and the uniquely novel features will be particularly pointed out in the appended claims.

In the accompanying drawings:

FIGS. 1a and b are elementary overall block diagrams illustrating in a composite manner the intermodulation spectra recorder in accordance with the principles of this invention.

FIGS. 2a and b are elementary overall block diagrams illustrating another alternative embodiment of the composite technique of intermodulation spectrum analysis with time variable frequency separation in acocrdance with the principles of this invention.

FIG. 3 is a detailed block diagram of the signal modulating apparatus employed in the embodiment of FIGS. 1a and b and shown for the Mode IIa measurement of the 5th IM term in accordance with the principles of this invention.

FIG. 4 is a detail block diagram of the modulator summing and output stage and sawtooth generator stages required for the modulator apparatus embodied in FIG. 3.

FIGS. 5a, b and c are detailed block diagrams of the output response analysis apparatus of the invention.

Figure 6A:
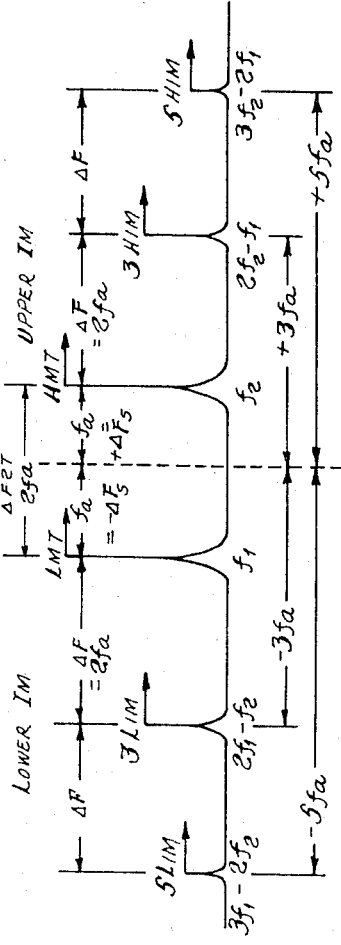
Figure 6B:
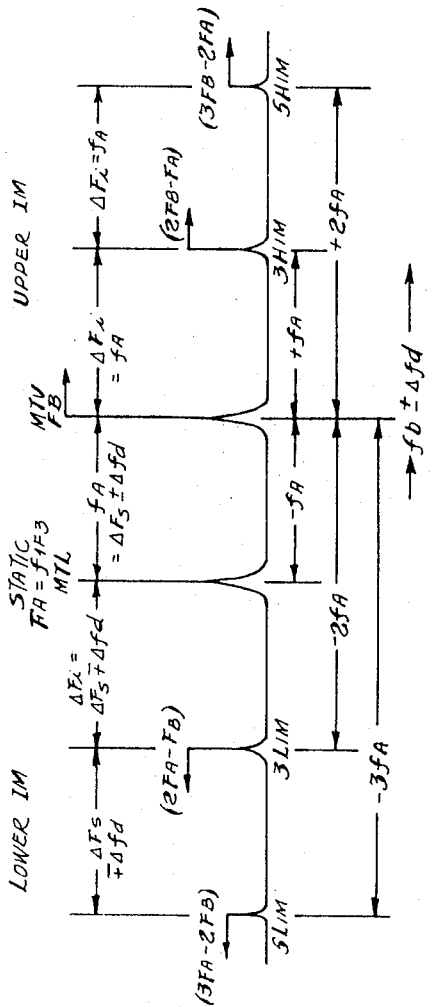

FIG. 6a is a graphical representation of the frequency spectrum for Mode I operation; and FIG. 6b is a graphical representation of the frequency spectrum of system operation for Mode II, with the 3rd IM spectra signature recording.

These drawings clearly illustrate the combinational test set arrangement where Mode I refers to my copending application and Mode II and Mode IIa demonstrate the added capability of recording $IM_3$ and $IM_5$ respectively in the generation and response output analysis of the newly derived test signal application of this invention. The designated numeral reference characters and most stage terminology used herein are that given in detail in the drawings, description and specification of the copending patent application. Numerals with associated lettered subscripts specifically point out the newly introduced stages of the differing embodiment required of Modes II and IIa operation with the exception of stages 8a, 15a, 35a, 35b, and 35c.

To further facilitate description of the test method that is of featured interest, a convenient convention of directed arrow heads at the component amplitude tip that designates the sense of nonstationary spectrum components is adopted. In keeping with a stated objective of this invention, the illustrated dual mode switching operation, where MSO designated switches are ganged, unexpectedly results in a practical integration giving a compatible composite test recorder for securing spectrum signatures. While the switch wipers are shown for example located in Mode I position, the descriptive material of this specification primarily concerns Mode II operation; where the switch wipers are set to position II.

Introduction to theory and operation

In accomplishing intermodulation spectra signature recording of four terminal electrical devices, as well as for multi-frequency systems, examination in depth is made of a particular frequency changing characteristic due to an intermodulation test signal experiencing the non-linearity of the test element that heretofore went almost unnoticed; having been totally unobserved by prior art technology. As herein disclosed, the test method introduced is shown and revealed to present certain intermodulation spectra relations which are found to formulate as observable modulation patterns on a sweep frequency fixed carrier basis.

From a frequency distribution viewpoint, a resulting spectrum response region produced after non-linearity is experienced is noted to be indicative of an amplitude modulation (AM) process. Here the spectra components of interest manifest themselves within a framework in a frequency analogous form of simulated amplitude modulation denoted as SIM.AM.

Implementation of this newly derived signal processing asserts itself by way of the unique operational signal generation and output response analysis technique of this invention as later described, and its conceptual modulation principles at this point are best understood from the derived analytical procedure set forth as follows:

As basic theory for the frequency analogous technique of "Simulated AM" observe two practical operations in being frequency equated and analyzed. First, amplitude modulation AM with tone frequencies respectively to cascade combination of linear summation network and non-linear device is viewed. Here third IM term principles give mathematical relations as follows:

For basic two tone combination where $F_1$ is lower tone frequency, and $F_2$ is upper tone frequency, with frequency difference $(F_2-F_1)=\Delta F$; then by prior art definition, third odd order lower difference frequency product is expressed as $(2F_1-F_2)$ and denoted as $IM_{3L}$.

Now let $F_2$ be linear frequency modulated, expressed as $(F_{2_0} \pm \Delta f_d)$; with $F_{2_0}$ being the quiescent frequency value and $(\pm \Delta f_d)$ being amount of linear frequency deviation while $F_1$ remains static. Thereupon substitution gives on an instantaneous basis:

$$IM3L_i[(2F_1-(F_{2_0} \pm \Delta f_d)]$$

or $$[(2F_1-F_{2_0}) \mp \Delta f_d]$$

or $$(IM_{3L_0} \mp \Delta f_d)$$

Hence $IM_{3L_i}$ and $F_{2_i}$ are observed to undergo like amount of frequency deviation but of an opposite sense. With $\Delta F_s$ set greater than $\Delta f_d$, then substitution for $\Delta F_i$ gives $(F_{2_0} \pm \Delta f_d - F_1)$ or $[(F_{2_0}-F_1) \pm \Delta f_d)]$ or $$(\Delta F_s \pm \Delta f_d)$$

for $\Delta F_s > \Delta f_d$.

Second on a comparative frequency distribution basis, "simulated AM" gives sweep frequency $(\Delta F_s \pm \Delta f_d)$ as audio input modulating signal and $F_1$ as the carrier input signal being applied to an amplitude modulator. AM type output becomes carrier signal $F_1$, upper sideband sweep signal $(F_1 + \Delta F_s \pm \Delta f_d)$ or $(F_{2_0} \pm \Delta f_d)$, and lower sideband sweep signal of $[F_1 - (\Delta F_s \pm \Delta f_d)]$ or $$[(F_1 - \Delta F_s) \mp \Delta f_d]$$

or $(IM_{3L_0} \mp \Delta f_d)$. In a similar manner for observing the fifth (5th) IM term (denoted as $IM_{5L}$) which (lower 5th IM) is defined $(3F_1-2F_2)$, follows: Substitution for $F_2$ gives: $[3F_1-2(F_{2_0} \pm \Delta f_d)]$ or $[(3F_1-2F_{2_0}) \mp 2\Delta f_d]$ or $(IM_{5L_0} \mp 2\Delta f_d)$; or expressed in alternate manner, $(F_{1-2}\Delta F_1)$ or $[F_{1-2}(\Delta F_s \pm \Delta f_d)]$ or $[(F_{1-2}\Delta F_s) \mp 2\Delta f_d]$. This 5th IM term along static tone $F_1$ and sweeping upper 3rd IM term effectively frequency simulates AM operation in the like way as derived above.

The 3rd IM component, expressed at $fIM_3=(2f_1-f_2)$ is often referred to as the main distortion term. For comparative examination, by way of the mathematical relationship of my copending application, now given as Mode I operation, $f_{1_i}$ and $f_{2_i}$ are both instantaneously varying by equal amounts and in like directions, that is $(\mp \Delta f_d)$; such that $(2f_{1_i}-f_{2_i})=(2f_{1_{cf}}-f_{2_{cf}}) \mp \Delta f_d$ or $$fIM_{3i}=fIM_{3b} \mp \Delta f_d$$

and this $fIM_{3i}$ does likewise wherein frequency inversion does not occur. The same effect pertains to the instantaneous 5th IM term for prior Mode I operation.

Clearly, for Mode II, in a frequency-wise manner the sweeping components of $fIM_{3i}$ and $f_{2i}$ about static equivalent carrier $f_1$ relate in an apparent AM sideband type location such as would be attained from a carrier $f_1$ being amplitude modulated by single swept tone frequency of instantaneous difference frequency value of $\Delta F_i$. Hence $f_{2i}=(f_1+\Delta F_1)$ and $fIM_{3i}=(f_1-\Delta F_1)$ may be similarly denoted as $[f_1 \mp \Delta F_i]$ which becomes frequency analogous to AM expressed as $(f_c \mp f_m)$, where $f_c=f_1=$carrier signal and $f_m=\Delta F_1=$modulating signal.

This invention is fundamentally based on the herein disclosed new principle frequency analogous simulated amplitude modulation which conveniently may be verbally stated as follows:

With one tone frequency of a pair of combined frequency tones held constant, then linear frequency variation of the other tone frequency of the pair results in the equal amount but opposite sense linear frequency variation of the intermodulation distortion component that develops most adjacent to the static frequency tone; when the two tone frequency pair of linear time varying frequency separation value experiences non-linearity in the course of its frequency excursion. Expressed on an instantaneous frequency basis as a manner of simulated amplitude modulation (AM) sideband distribution, then main lower tone $f_1$ represents a static carrier $[(f_1+\Delta F_s) \pm \Delta f_d)]$ as the USB term, and $[(f_1-\Delta F_s) \mp \Delta f_d]$ as the LSB term that represents the lower third odd order difference frequency intermodulation distortion product term, and denoted as $(fIM_{3Li})$.

Novel and advantageous use is made hereinafter of the technical merit of this newly observed relationship, which at times for descriptive convenience may be best termed as a carrier-sideband swept two tone type test signal operation, or considered asymmetric.

Double conversion of the resultant frequency information is normally required in high frequency output response analysis. The first conversion operation accomplishes stable translation of a static spectrum component of interest, $f_c=f_1$, to be at a pre-determined 1st IF value. The succeeding and second translation results, for one case, in the sweep frequency cancellation of the sweeping $IM_3$ term and by way of audio frequency shift conversion to be statically located at the 2nd IF resolving acceptance slot of the frequency response plottry system. Visual display recording is obtained by synchronization of the sweep voltage source and the CRT beam horizontal deflection, along with the recording X-axis direction.

FIG. 1.—Description and operation

Referring now to FIG. 1a, which comprises controlled variable oscillator 10, drift-free modulator 11 consisting of frequency converters A17 and B18, RF output stages 12, variable frequency audio oscillator 9, balanced modulator 14, fixed frequency crystal oscillator 16, variable frequency crystal oscillator 15, sawtooth voltage generator 13 as in Mode I; and three newly supplied stages are thereto connected for Mode II.

FIG. 1a is, by way of mode switch MS01 and MS02, shown to differ from FIG. 1a of my copending application by the added inclusion of tone meter switch MS11, upper sideband crystal filter 14b (which alternatively may be lower sideband type) RF tone meter 11b and linear sum combiner 12b.

Within the confines of this advanced concept of signal generation that encompasses a dual capability, it is to be observed that the test signal source produce the prime test signals and further simultaneously supplies the separate and companion operating support signals which tend to be functionally representative of the generated prime signals characteristics.

The test signal source section 1, serves to provide the desired prime test signals to the input of the unit under test 200, and also simultaneously provides seven support operating signals to the output analysis section.

In addition to the Mode I, two tone-swept in-step output test signal, and the Mode II two tone-carrier-sideband swept test signal generation, section 1 internally supplies the following operating signals for the output analysis section 2:

(a) A selectable frequency controlled signal output, $f_1$, of controlled variable oscillator 10, which signal functions as a static tone and as the reference frequency for variable oscillator 4 of FIG. 1b.

(b) A crystal controlled, sweep frequency modulated local oscillator output signal, $(f_{l.o.} \pm \Delta f_d)$, supplied internally to frequency converter B18 of drift-free modulator 11. Here $f_{l.o.}$ represents the center frequency value of the voltage swept variable frequency crystal oscillator 15, which is being frequency modulated in a linear manner with time by the saw tooth voltage applied to its voltage sensitive modulating element from the sawtooth voltage generator 13. The frequency deviation output is expressed as $(\pm \Delta f_d)$. Operating signal $b$ is being applied to the IF frequency converter B21 of FIG. 1b of the frequency shift local oscillator stage 6 in the output analysis section 2, either directly by switch MS05 or after frequency doubling by RF doubler 21a for the selection of the desired main third or the 5th IM terms of interest and simultaneously allows for the sweep frequency removal operation.

(c) The linear sawtooth sweep synchronizing voltage output of the sawtooth generation stage 13 is applied to the horizontal deflection plates of the CRT indicator 8 and constitutes the synchronized time base of the test system, either in visual plotting or chart recording.

(d) The crystal controlled fixed frequency signal, $f_{l.o.}$ supplied by fixed frequency crystal oscillator 16 which also is supplied internally as the carrier signal to balanced modulator 14. Signal $d$ is further applied to IF frequency converter A20 of IF drift-free modulator 19 of FIG. 1b for position I and II of switch MS04, or applied after frequency doubling by RF frequency doubler 20a at position IIa.

(e) The audio frequency signal output, $\Delta F_s$, of variable frequency audio oscillator 9 supplied as the fixed modulating signal to balanced modulator 14. Signal $e$, in Mode I, is applied to variable audio frequency multiplier 23 of frequency shift local oscillator 6; directly to IF shifter 22 for Mode II, and to audio frequency double 23a for Mode IIa. It functions to allow for the precise tuning of the shift oscillator 6.

The remaining two supplied signals are derived from controlled variable oscillator 10, but in less precise applications requiring other than a full frequency synthesized embodiment, these two signals may be supplied by separate crystal oscillators.

These two signals are:

Signal $f$ which is of frequency $f_{IF_3}$ and is supplied for phase locking purposes to frequency controlled variable frequency oscillator 4 of the output section, and signal $g$ which is of frequency valve $(f_{IF_3}+f_{IF_4})$ and is simultaneously supplied as the quiescent IF input signal to the IF shifter 22 and IF drift-free modulator 19 of frequency shift oscillator 6.

The carrier-sideband two tone swept with time test signal applied to the unit under test 200 will also be shown generated in two differing ways. Such a type test signal can be a linearly combined carrier-audio sideband sweeping two tone signal wherein the upper main tone frequency location exhibits a frequency sweep variation in a linear fashion with time such that the two tone audio frequency separation is attained from an audio sweep source. This type of test signal generation is described in detail herein with reference to FIGS. 2a and 2b, which illustrates an alternate method of IM spectra signature recording.

Formulation of controlling test signal sources, which may conveniently be termed Pal Signal Generation techniques of companion prime and support type signal production, facilitates the implementation of a test set directed towards accomplishing the automated test methods.

Accordingly, in the test signal generation of FIG. 1a, a stable carrier frequency signal $f_1$ is generated by the crystal frequency controlled variable oscillator 10, and is applied over four separate paths. One path supplies $f_1$ as the input signal to the drift-free modulator 11. Over the other paths $f_1$ is directly supplied as one input signal to linear sum combiner 12b, RF tone meter 11b, and as operating signal $a$.

Input signal, $f_1$ to frequency converter A17 of drift-free modulator 11 is therein mixed with another input signal obtained from but one sideband of the double sideband output of balanced modulator 14. The local oscillator signal, designated $f_{l.o.}$ which is the carrier signal applied to balanced modulator 14, is supplied by the crystal controlled fixed frequency local oscillator 16; and has been set to be equal to the quiescent frequency value, $f_{l.o.}$, of the crystal controlled variable frequency oscillator 15. Hence within the drift-free modulator 11, any frequency discrepancies between these two generated signals, including their frequency drift is therein minimized.

The audio amplitude modulating signal $\Delta F_s$ is applied to balanced modulator 14 input from the output of variable frequency audio oscillator 9. The modulated output of the balanced modulator 14 thus is a double sideband-suppressed carrier wave of single tone modulation. The two RF tone frequencies appearing at the output of the balanced modulator 14 are the lower sideband tone of difference frequency product, and the upper sideband tone of sum frequency product; and wherein the local oscillator signal $f_{l.o.}$ applied, is balanced out so that it is heavily suppressed in the modulator output.

The two sideband frequency signals in the output are of equal amplitudes and a symbolic representation of their spectrum is shown at 14a. Here the frequency separation interval, which is the difference between the two frequencies is twice the single tone modulating frequency, or $2\Delta F_s$.

Drift-free modulator stage 11 essentially functions to produce at its output the combined modulation of AM and FM with respect to the applied input frequency value of $f_1$ from controlled oscillator 10. Accordingly, in Mode I, the double sideband and modulation is translated to about the $f_1$ value as the suppressed carrier frequency, and the sweep frequency modulation thereupon transferred to about the $f_1$ value as the quiescent center frequency value of the sweep modulated wave output.

Since Mode I operation was described in detail in my copending application, consideration is so directed to Mode II operation, wherein the double sideband output $(f_{l.o.} \pm \Delta F_s)$ of balanced modulator 14 is applied to upper sideband crystal filter 14b; whereupon the lower sideband component of $(f_{1.o.}-\Delta F_s)$ is eliminated. The resultant passed output of USB crystal filter 14b, is as given by spectrum sketch 14c $(f_{1.o}+\Delta F_s)$, and thus becomes the new local oscillator signal to frequency converter A17.

The signal operations of the drift-free modulator 11 of FIG. 1a, and IF drift-free modulator 19 of FIG. 1b are analyzed and described in detail in my forementioned copending application.

The drift-free conversion modulation principle may be generally stated as allowing the transfer of modulated information from an external local oscillator signal to be made about a stable selectable input signal without degradation of stability. Two local oscillator signals of equal quiescent frequency value are supplied thereto and a double conversion operation with first sum filtering then difference filtering (or vise versa) is brought about. A significant departure from this prior Mode I operation is introduced by the insertion of an audio shift. Herein as shown, one local oscillator signal, is audio frequency offset from the other l. o. signal by an interval of $\Delta F_s$ amount.

Hence quiescently, that is with sweep width equal to zero, Mode II l.o. signal is $(f_{1.o.}+\Delta F_s)$ and the other l.o. signal remains as $(f_{1.o.})$. The sweep frequency deviation of $(\pm \Delta f_d)$ is thereupon taking place about the new center frequency value of $(f_{1.o.}+\Delta F_s)$. Hence, in accord with the principles of this drift-free double conversion modulator 11, its output frequency is audio frequency shifted by a like amount to thereby become $(f_1+\Delta F_s)$ and the frequency deviation $(\mp \Delta f_d)$ is thereupon transferred to this new selectable center frequency value.

Hence the RF output of drift-free modulator 11, in Mode I, is a double sideband swept signal representative of what is designated a two tone swept-in-step signal, as shown by spectrum sketch 11a. With one sideband of the pair removed it becomes a swept frequency modulated sideband signal, expressed as $(f_1+\Delta F_s \pm \Delta f_d)$. This signal, in Mode II, is applied as one of the two inputs to linear sum combiner 12b. The other combiner 12b input is directly obtained from the output of controlled variable oscillator 10, being of $f_1$ value.

These respective inputs to linear sum combiner 12b also connect to separate contacts of the SPDT tone switch MS11 feeding RF tone meter 11b, which serves in determining the equal amplitude relationship therebetween before being combined. Then being linearly combined, a two tone equal amplitude type signal appears at combiner 12b output, whereby one tone is the static lower value $f_1$ input and the other tone of the pair is the frequency varying upper value $(f_1+\Delta F_s \pm \Delta f_d)$ input.

In measuring intermodulation distortion of practical devices and in obtaining intermodulation spectra signatures thereof, it is necessary to make such measurements at several drive levels; since the relative levels of the intermodulation components are observed to be sensitive to the particular drive level applied. Variation and setting of the selected drive levels at the test signal source section output is obtained in passing test signal output of network 12b to input of unit under test 200 by way of a variable output attenuator within output stage 12.

This static carrier-sideband swept frequency pair feeds from the combiner 12b output through the RF output stages 12 when MS02 is set to Mode II position. Spectrum sketch 12a is representative of the generated signal output.

The output stages 12 amplify, set, and monitor the desired drive level test signal output to be applied to unit under test 200.

For synchronization, the sweep modulation voltage is of the linear sawtooth type and is generated from sawtooth voltage generator 13. It is applied to vary the frequency of variable frequency crystal oscillator 15; which variation results in the equal deviation of the center frequency by an amount designated $(\pm \Delta f_d)$ in a linear manner with time.

The principles of the output analysis method of Mode I operation are given within my forementioned copending patent application. Broadly speaking, this Mode I system exhibits a two frequency response plotting technique for the linearity evaluation of RF systems; and is designated symmetrical.

Having herein derived spectra component patterns that result from the passage of a carrier-sideband swept signal through a non-linear device, it now remains to uniquely and automatically produce the analysis and frequency plot thereof. Since the IM term of interest is a sweeping component, then for achieving of 100% intercept within a narrow selective passband, a fixed or static component must be obtained.

Observe now, a tone frequency $f_1$ which increases by an amount say $\Delta$ c.p.s. to become $(f_1+\Delta)$, and the initial difference frequency separation value of $\Delta f$ c.p.s. for a second tone frequency $f_2$ also increasing by equal amount, to say $(\Delta f+\Delta)$. Then the third upper odd order resulting IM term frequency value becomes $$(f_1+\Delta)+2(\Delta f+\Delta)$$

Thus the third odd order lower resulting IM term frequency value becomes $(f_1+\Delta)-(\Delta f+\Delta)$ or $IM_{3L}=(f_1-\Delta f)$ and is therefore of a constant frequency. In a like manner for the 5th IM lower term frequency, where $f_1$ increases by $\Delta$ value and $\Delta f$ increases by $\Delta/2$ amount, then $$\left[f_1+\Delta-2\left(\Delta f+\frac{\Delta}{2}\right)-f_1-2\Delta f\right]=IM_{5L}$$

For $\Delta f$ and $f_1$ to increase by like amount of $\Delta$, $f_2$ must increase at twice the amount or $2\Delta$.

For $\Delta f$ to increase at one-half the amount of $f_1$'s increase, $f_2$ must increase at 3/2 amount of $f_1$ or 1.5 times. Hence to obtain a fixed frequency location, for $IM_3$ the sweep tones becomes $(f_1 \pm \Delta f_d)$ and $(f_2 \pm \Delta f_d)$; and for $IM_5$ the sweep tones become $(f_1 \pm \Delta f_d)$ and $$\left(f_2 \pm \frac{3}{2}\Delta f_d\right)$$

where $(\Delta f_d)$=sweep frequency deviation, or as developed herein $(f_1 \pm 2\Delta f_d)$ and $(f_2 \pm 3\Delta f_d)$. Accordingly, $$2(f_1+\Delta)-(f_2+2\Delta)=2f_1-f_2=IM_3$$

as a static term; and also $$\left[3(f_1+\Delta)-2\left(f_2+\frac{3}{2}\Delta\right)\right]$$

as a constant frequency.

In analogous accord with the above frequency deviation relationships, the dual sweeping main tone signals of $f_1$ and $f_2$ are thereupon so generated and applied by way of the present invention, at the final mixing stage of the output analysis signal process by the addition thereto of the frequency deviation increase. In doing so, the existing sweep frequency deviation of the specific case IM term under analysis is negated, since it is of opposite polarity. Simultaneous IM term coincidence with resolving IF BW is induced by properly directed audio frequency shift operation.

In Mode II operation variable audio frequency multiplier 23 is by passed by operating signal e; such that the $\Delta F_s$ audio frequency signal is applied directly to the modulating signal input of IF shifter 22.

FIG. 1b includes new stages for 5IM term plotting, which comprise a pair of RF frequency doublers 20a and 21a, audio frequency doubler 23a, and a X–Y graphical recorder 8a.

The IF shifter 22, described in my copending referred patent application, is used directly in Mode II and IIa to supply audio frequency shifting by amount $\Delta F_s$ and $2\Delta F_s$ resectively. Use is made of a trio of frequency doublers and an extra IF amplifier. RF frequency doublers 20a and 21a produce like multiplication of local oscillator quiescent frequency value to IF drift-free modulator 19, while doubler 21a also gives twice the sweep frequency deviation. Band switching of IF frequency converter A20 is made in the Mode IIa case. The audio frequency doubler 23a supplies the required $2\Delta F_s$ signal to input of IF shifter 22. All other stages and their function are as described in detail as referred to in my co-pending patent application. Spectrum sketch 200a represents the essential frequency component response of interest due to non-linearities of a system or unit under test 200 in responding to the Mode II test signal input being applied thereto. Other IM terms such as the 3rd upper IM term and a pair of 5th IM distortion components also develop, but it will be observed that such terms do not interfere with the frequency response plotting of the 3rd lower IM term of concern; since $\Delta F_s$ is noted as set to be greater than $\Delta f_d$. Thus a similar signal processing technique, in accordance with the output test response analysis description that follows for the measurement of the subject 3rd IM term, may also be applied in the case of 5th IM term plotting; that is where again $\Delta F_s > \Delta f_d$, or less deviation than frequency separation.

Since the signal process remains essentially the same, consider now only 3rd IM term output type response analysis and recording that automatically occurs.

The spectrum under evaluation becomes the input to the output analysis section 2. The input spectrum is applied to frequency converter 3 which is also receiving a local oscillator signal of stabilized frequency $(f_1 + I.F._3)$ from controlled variable frequency oscillator 4. As mentioned earlier, controlled variable oscillator 10 supplies its output frequency $i$ as a reference. Accordingly, the tuning of oscillator 10 and modulator 11 is mechanically coupled with the tuning of frequency controlled VF04. The tuning of controlled VF04 is set to a frequency above that to which oscillator 10 is tuned, by a fixed frequency amount equal to the 3rd I.F. frequency value, i.e. $f_{IF_3}$. A closed automatic frequency control (AFC) loop within the controlled VF04 thereupon acts to stabilize and control the local oscillator signal output of VF04 at a value of $f_1.F._3$ above the reference input of $fi$.

As disclosed herein, the method of IM spectrum analysis with time variable frequency difference functionally requires differing output response analysis from that of my copending patent application where the audio frequency difference was kept constant. To accommodate the handling of now oppositely directed sweep excursion of the odd IM term of interest, the useful heterodyne frequency inverting property of the double conversion direct signal processing path operation may be applied in one or two ways. Alternatively, the desirable sweep direction for the effecting of sweep frequency cancellation of the IM₃ excursion may be obtained from the frequency inversion which is set to occur in the double conversion operation of the output analysis section's IF drift-free modulator 19 arrangement.

In the area of time varying frequency difference non-stationary output response spectrums of the "simulated AM" nature, prior art AFC techniques are found suitable to bring about stabilization and control of the desired RF to IF translation in the testing of multi-frequency systems by IF path filtering of the static tone frequency for error comparison. However, the synthesizer referenced RF-IF frequency conversion technique, accomplished by way of frequency controlled variable frequency oscillator 4 of FIG. 1b, as in my copending patent application, is equally applicable for RF device test in a like operational manner.

Input frequency converter 3 thereupon is predetermined to produce the difference frequency product terms of which the resulting product output of interest in this analysis consists of $$[(f_i + f_{1F3}) - fi[\mp]\Delta F_s \mp \Delta f_d)] = f_{1F3}(\pm)[\Delta F_s \mp \Delta f_d]]$$

Hence $f1F3$ is a static component representing the translated static main tone $f_1$ with an opposite sense pair of equal sweeping sidebands about it, one sweeping term being of value $[f_{1F3} + \Delta F_s \mp \Delta f_d]$ and the other sweep term expressed as $[f_{1F3} - \Delta F_s \pm \Delta f_d]$. A typical example spectrum sketch of these translated components of prime interest is given in sketch 3a; in which sketch allows general convenience for the compatible analysis that follows, omits the illustration of other passed product terms that develop and the frequency inversion. Note for IM3 plot, the other frequency components are well removed and the polarity designations are arbitrary where corresponding frequency inversion may be thusly brought about elsewhere within the signal processing procedures as forementioned. For one example frequency controlled VF04 may supply $(f_1 - f_{1F3})$ as local oscillator signal to frequency converter 3. The frequency converter 3 output bandwidth is set to be sufficiently wide and flat to pass all sweeping IM terms of interest, that is IM₃ and IM₅ of both upper and lower frequency distribution, and this spectrum output becomes the signal input applied to sweep frequency removal and resolving frequency converter 5 which receives its local oscillator signal from frequency shift local oscillator 6. As mentioned prior, the sweep frequency modulated output expressed as $(f_{1.0.} \pm \Delta f_d)$ is supplied to the frequency shift oscillator 6. The shift oscillator 6 performs two functions. One function accomplished by the use of IF drift-free modulator 19, is to transfer the sweep frequency deviation ($\pm \Delta f_d$) being generated to about a new center frequency value that is greater than the 3rd I.F. frequency value by an amount equal to the 4th I.F. frequency value or $fCF$ new $= (fI.F._3 \pm fI.F._4) = IF$.

The other function, which is achieved using variable audio frequency multiplier 23 and IF shifter 22 is in the Mode I case, and using only IF shifter 22 in Mode II, to bring about the frequency shifting of this new center frequency value by selected audio frequency amounts of $\pm M\Delta F_s$ upon successive scan cycles of the test system for Mode I, and by $\Delta F_s$ amount or $M = 1$ in the case of Mode II. The $\Delta F_s$ interval is predetermined and thereafter selectable.

Considering the heterodyning operation between $fCF_i$ and $fIM_{3i}$, the two sweep frequency modulated inputs to the converter 5, the two signals are of identical sweep frequency deviation and direction but of differing center frequency value by an amount equal to the 4th I.F. value. The output of converter 5 is set to be highly selective about the 4th I.F. frequency value, which is the quiescent difference frequency product of the two heterodyned signals. Accordingly, over the course of the sweep frequency interval, the instantaneous frequencies, $fCF_i$ and $fIM_{3i}$, of the two waves at all times differ by the fixed I.F.₄ value; and this process results in the translation of the spectrum under analysis to have $fIM_3$ statically centered at the 4th I.F. frequency bandpass slot shown sketched in FIG. 5a.

The I.F. drift-free modulator 19, like drift-free modulator 11, consists of two frequency converters which are receiving the same two local oscillator signals as modulator 11 except the sideband modulation is omitted. Thus, I.F. frequency converter A20 has applied to it the CW signal $f_{1.0.}$, while I.F. frequency converter B21 receives the swept frequency signal $(f_{1.0.} \pm \Delta f_d)$. The input signal to modulator 19 is supplied by I.F. shifter 22 and is $f_1F4 + f_1F3(\pm)M\Delta F_s$. With the audio frequency shifting intervals being of relatively narrow range, the two converters of modulator 19 are fixed tuned to the predetermined I.F. values of interest. In a like manner of operation as modulator 11, modulator 19 produces an output, where the frequency deviation ($\pm \Delta f_d$) has been transferred to about its input signal frequency. In Mode II, the subsequent shifting of the input frequency to modulator 19 is brought about by the direct frequency application of $\Delta F_s$ to I.F. shifter 22. The balanced modulator of shifter 22 receives operating signal $g$ as the carrier input or $(f_1F3+f_1F4)$.

Without changing the tuning of any of the other oscillators, the shift oscillator is manually offset by the interval of $\Delta F_s$, either in the positive or in the negative direction, via the independent polarity selector control of IF shifter 22.

Thus, upon separate, and if desired successive and sequential, scan cycles of the sweep frequency system here for $M=1$, then the $\Delta F_s$ shift occurs for the main distortion third I.M. plot. A similar type action occurs for $M=2$, with shifting by $(\pm 2\Delta F_s)$, for resolution of the 5th I.M. terms in Mode IIa operation as briefly described hereinafter with respect to FIGS. 5a and b.

Detector and deflection amplifier 7, which may be of the linear or log detection type, detects any component response at the $fI.F.4$ location and amplifies this response to some suitable level for application to the vertical plates of CRT indicator 8 in a conventional manner. As mentioned earlier, the sweep synchronization voltage from sawtooth generation stage 13 is being applied to the horizontal plates of CRT indicator 8, and also to the X input of graphical recorder 8a.

Accordingly a visual display results on the CRT screen and for a scan cycle a pattern is plotted, whereby the vertical or amplitude response represents the relative db magnitude of a particular IM spectrum component being analyzed and the horizontal or frequency excursion represents the band location at which the particular amplitude response is occurring.

In full accord with the theory and new principles disclosed by way of the descriptive explanation and mathematical relations given earlier in this specification one scan cycle in Mode II position plots the amplitude desponse of the third IM component, either upper or lower depending on use of upper or lower sideband type crystal filter 14b, and the direction of the sideband sweeping tone; the traceout being made with respect to the audio frequency separation value where so desired or with the instantaneous frequency location of the sweeping tone test signal.

Accordingly, a frequency-amplitude relationship is established, whereby the pattern visually plotted on the CRT screen is indicative of the spectra signature of the 3rd IM response of the RF unit under test 200 over the portion of the band width region being examined. In a like manner as just described, using now a lower sideband crystal filter and opposite direction of frequency inversion the upper tone is kept static and the lower tone frequency sweeps, a plotting of the response characteristic of the other half portion bandwidth of unit under test is made.

As noted from the mathematical relations shown derived earlier, the 5th IM term develops a sweep frequency excursion also of opposite sense like the prior 3rd IM term, but in this case of twice frequency deviation amount at a location of double audio frequency offset below the static tone, or $(f_1-2\Delta F_s)$. Therefore for fifth (5th) IM term measurement and plot, a pair of RF frequency doublers are to be used, whereby $$(2f_{1.o.}+2\Delta F_s \mp 2\Delta fd)$$

and $(2f_{1.o.})$ signals are generated for IF drift-free modulator 19. Such ($\times 2$) frequency multipliers are given with the elementary general FIG. 1b drawing, and are shown in greater detail in FIG. 5b, fully illustrating a composite test set.

Herein there is imposed no restrictions on the scanning velocity (sweep width, c.p.s. × sweep rate c.p.s.) developed by the sweep frequency modulated test signal source of FIG. 1a and essentially the test system affords 100 percent intercept capability for the output analysis section to detect and evaluate the spectrum content that is produced in the output of the device under test 200. Hence if information were to exist at the 100 kc. frequency value at 2nd resolving IF frequency, it is subsequently detected either in a linear or log manner as selected, and amplified to the proper voltage level for application to the vertical plates of the CRT indicator 8 in the conventional manner.

For the wide dynamic range capability that the test system is to deliver, the visual representation of such a variation may be readily interpreted on a 5″ CRT screen by use of a calibrated pad between the frequency converters 3 and 5. This procedure gives a selection of range being observed on the CRT screen such as 40 db and with a calibrated 20 db pad to give 60 db range, or with a calibrated 40 db pad for a 80 db range expansion as desired by the operator.

It now can be seen that on separate scans of the sweep cycle, the plot of detected frequency response in the bandwidth of the device under test 200 subsequently presents a comparative sequence of all response curves of interest, that is, the main tone and the 3rd and 5th IM components, which may be plotted on the CRT screen to the same or related scales wherein all circuit parameters of the device under test remain unchanged.

For typical recording example, to complete the intermodulation spectra signature test of the common IF-RF stages of an independent sideband transmission system with each set of IM curves plotted for a particulalr $\Delta F$ sweep interval, the generated voltage input of the test signal and the peak enveloped power from an associated transmitter power monitor, along with the transmitter channel frequency are noted.

The ISB transmitter may be tested at adjusted input levels that produce ½, 1, and 1½ time rated peak-envelope power in dbm.

The power output monitor of the transmission system provides data on the rated PEP (peak envelope power) obtained in the following way. By suitable switching means at the test signal source combiner inputs, the sweeping tone is removed from the test signal input. The power monitor then measures the mean power output due to the remaining single tone input signal. Rated PEP thereby equals four times power output in watts due to the single tone.

The embodiment of FIG. 1 is made herein as an example directly illustrating the duality of a number of common stages in the composite test set recorder. However, the test method itself stands out as distinctly general and not limited thereto. Considering another embodiment as FIGS. 2a and b which also retains the capability of formulating the composite test set, observe functionally differing apparatus in use.

In the approach to the method of test being disclosed, variable frequency audio oscillator 9 of FIG. 1a is replaced by linear variable frequency audio swept oscillator 9b that generates audio frequency sweep signal output $(\Delta F_s \pm \Delta f_d)$ in responding to the output of sawtooth voltage generator 13 applied to its voltage controllable variable frequency element with MS01b into position II.

The sweep frequency output of $(\Delta F_s \pm \Delta f_d)$ is the modulating signal input to the balanced modulator 14, with the static carrier input remaining as signal $f_{1.o.}$.

The sum product passed by USB sideband crystal filter 14b becomes local oscillator signal at MS301, position II expressed as $(f_{1.o.}+\Delta F_s \mp \Delta f_d)$, and functions as the sweeping local oscillator signal to the first conversion operation of the RF drift-free modulator 11.

The second conversion operation receives quiescent frequency local oscillator signal of $f_{1.o.}$ from variable frequency crystal oscillator 15 which no longer is frequency modulated by generator 13.

To facilitate a corresponding double conversion pattern for the IF drift-free modulator 19, in accord with that of drift-free modulator 11, the pair of local oscillator signals of $b$ and $d$ are made interchangeable by way of mode switch MS01a and MS02a. In the Mode II case signal $b$ becomes $(f_{1.o.}+\Delta F_s \pm \Delta f_d)$ and signal $d$ becomes $f_{1.o.}$. The remaining stages and signal processing operation is unchanged; and in like accord with the descriptive performance given for FIG. 1a, the desired carrier-sideband swept test signal is likewise generated.

Herein the output analysis section 2 of FIG. 2b, again little change is notable between Mode I and Mode II. The normal quiescent second local oscillator frequency signal without audio offset, that is $(f_1F_3+f_1F_4)$, is now applied as the direct signal input to IF drift-free modulator 19, by way of mode switch MS03a.

Here again, IF drift-free modulator 19 operates much in the same manner as the RF drift-free modulator 11 except that it is non-tunable, that is, of fixed frequency range. With $(f_{IF}+f_{IF4})$ input signal $g$ and local oscillator operating signal $d$ of $f_{1.o.}$ value applied to first conversion process and local oscillator operating signal $b$ of $(f_{1.o.}+\Delta F_s \mp \Delta f_d)$ applied as the second converter hetrodyne signal, IF drift-free modulator 19 produces an output signal that represents its input signal offset by an audio interval $\Delta F_s$ about which the linear sweep frequency deviation is transferred. IF modulator 19 output then becomes the sweep frequency cancelling local oscillator applied to frequency converter 5 and is expressed as $[fIF+fIF_4-\Delta F_s \mp \Delta f_d]$.

Here the quiescent frequency of the sweeping local oscillator signal is $fIF_3+fIF_4-\Delta F_s$. Since the sweeping third lower IM distortion term at frequency converter 5 input and the swept local oscillator signal are developed to be of like sweep direction excursion and of equal frequency deviation amount, the sweep frequency cancellation principle is again as occurs for the difference frequency product therebetween. With sweep frequency removal accomplished, and the exact audio frequency shift conversion required as produced by way of the applied local oscillator signal to the frequency converter 5, thereupon the 3rd IM term of interest is made static and frequency translates as a singular component into the acceptance slot of 2nd IF selective resolving filter region as sketched at 5a. All other associated frequency terms are well removed from this resolving passband through filtering, and the constant 3rd IM term passes unattenuated as the singular filtered output to be conventionally detected and applied to the vertical input of the CRT detection and display section, and/or recorder 8a.

Composite system operation for fifth IM plotting

Having been predominantly concerned with the 3rd IM term plotting, it now remains to describe the tracking of the 5 IM term of interest to obtain the required full IM spectra signature recording. With the time variable frequency separation between a static carrier tone and an adjacent 3rd IM component noted as being $\Delta F_1$; and the frequency difference between this adjacent 3rd IM term and its adjacent 5 IM component, is also being $\Delta F_1$. Then the resultant frequency change of the 5 IM term becomes double, that is $2\Delta F_1$, with respect to the static carrier tone frequency.

To now accomplish the sweep frequency removal operation as earlier described, the basic sweep rate of $(\mp \Delta f_d)$ is then also to be doubled, i.e., expressed as $(\mp 2\Delta f_d)$. Since it is also desirous from a utilization viewpoint to operate essentially within similar apparatus of FIG. 1, a trio of factor or two multipliers and an extra IF filter, as advantageously used, functionally serve to bring this about in the way best understood from the following description of mode IIb operation as exampled and detailed in FIGS. 3, 4 and 5.

Usually a different degree of sweep excursion is set for each particular unit under test, the bandwidth being less than the amount of deviation used for the IM 3 plotting. Correspondingly, the initial $\Delta F$ setting may also be reduced to obtain sufficient data. Generally optimum correlation is attained where the $\Delta F_s$ value is of one half the amount used for the IM3 plot along with a one-half reduction of the frequency excursion while the static carrier frequency location remains unchanged. Under these established conditions the IM$_3$ term and the IM$_5$ on separate plots, develop at frequencies within the flat response bandwidth region of the unit under test. Other relationships of course are possible but the prior IM$_3$ criterion that $\Delta F_s$ be greater than $(\mp \Delta f_d)$ remains in effect for the IM$_5$ measurement mode.

Observe the detailed practical embodiment of the combinational test signal source section of FIG. 1a as shown by the further detailed block diagrams of FIGS. 3 and 4. The frequency controlled variable oscillator 10 is again shown in simple block form in FIG. 3 since it is well known that various type frequency synthesizers are readily available and may be incorporated herein as shown.

The detailed description of the illustrated stages is as given in the specifications of my aforementioned pending application and accordingly is not repeated in full herein. In brief, review of added details it should now be noted that frequency multipliers 35 and 38 are utilized to allow greater linear sweep width coverage. Typical voltage controlled crystal oscillators, usable as crystal controlled variable frequency oscillator 15, are known to have linear excursions of 0.01% greater; which for example at 30 MC5 gives a ±5K c.p.s. linear frequency sweep. Except for the "N" factor multiplied frequency deviation, FIG. 3 and 4 signal processing is essentially unchanged from that given in the description of FIG. 1a.

For Mode IIa operation, where IM5 term response is examined, the detailed circuits arrangement of FIG. 5a and b shows extra frequency multiplier 146a, like the frequency doubler 21a of FIG. 1a, of times two factor, doubling the swept local oscillator signal of IF drift-free modulator 603, in FIG. 5a; and also second frequency doubler, frequency ($\times 2$) multiplier 144a, like the frequency doubler 20a of FIG. 1a for the static local oscillator signal of IF modulator 603, along with similarly mode IIb included narrow band IF amplifier 145a in FIG. 5b are shown.

In the circuits arrangement of FIG. 5a and 5b, further use is made of audio frequency multiplier 601, which is set to pure mode position by mode select switch 610 for M=2 in the case of Mode IIa operation. Note that this procedure allows selection of ($2\Delta F_s$) and functionally repeats the operation of audio frequency doubler 23a and switch MSO3 of FIG. 1b.

FIGURE 5a further includes an added path for the output of input frequency converter 3, which connects to contact II of switch MS10, while position I of this switch closes the usual AFC loop for frequency controlled variable frequency oscillator 4. For testing of multi-frequency systems, MS10 is set into position II, and an internal AFC mode II operation is effected for the filtering and frequency error comparison and correction of the translated static signal to be at $fIF_3$.

Thereby the supplying of signal ($a$) ($f_1$) is best for a unit under test such as a RF amplifier, while the new internal AFC operations are applicable for a system under test wherein internal frequency conversion is taking place such as IF to RF frequency converters.

Within the test operation for a multi-frequency system under test, further frequency inversion of the response sideband structure is likely to occur. Then in accordance with the principles of this invention it is clear that the required polarity sequence designation for the proper sense direction of both, the sweep-frequency deviation ($\Delta f_d$) and the audio frequency offset internal ($\Delta F_s$), along with the resultant pattern plotting on the CRT screen can be readily instituted by conventional design either in the direct double conversion signal process or within the multi-heterodyne operation of frequency shift local oscillator 6.

In light of the detailed description given for prior Mode I operation of FIGS. 5a and 5b in my copending application, and in further view of the earlier detailed description given for FIG. 1a and FIG. 1b for the Mode II operation of this present invention, the function and operation of the illustrated embodiment of FIGS. 5a and 5b has been well explained and at this point becomes self-evident.

The full compatibility of the two operational modes has been shown and made clear as a matter of convenience in being directed for evaluation performed on a unit under test 200 which does not have internal heterodyne operations. At this point, it is desirable to show the benefit derived from a full operational compatibility for multi-frequency systems test. For Mode II, as well as for Mode IIa an internal AFC operation has been shown applicable. Further the not so obvious ingredients that make for multi-frequency systems test for the Mode I case are applied; where now the two tone swept-in-step type signal with associated intermodulation distortion content is to be translated and stabilized without the benefit of reference signal a, as earlier used. This novel AFC operation is uniquely implemented by the detailed closed loop circuits arrangement of FIG. 5c, as shown related to the output wherein the AFC system exploits more traditional circuitry in a far from trival manner.

It should be noted from spectrum sketch 140a, that the entire sideband structure is non-stationary, that is time varying, at input to 4th mixer 141 and appears as static spectrum content 141a at mixer 141 output.

Either of such signals which develop within the test system of this invention stand out as being difficult to stabilize and requires a non-too obvious approach to overcome such obstacles thereby avoiding the well-known conventional separate frequency synthesizer as a substitute use for frequency controlled variable frequency oscillator 4 of FIG. 5a, and being therefore required to endure the obvious disadvantage that results therefrom.

Prior art classifies two frequency signals, such as double sideband and two tone equal amplitude as hybrid waveforms, that is, possessing both amplitude and phase modulated characteristics. The energy swept type spectrum of 140a, while of constant level for narrow band sweep excursion, possess a complex rapid phase modulation variation with respect to time. The 4th mixer 141 serves to effect removal of the periodically time varying phase characteristic by way of the sweep frequency cancellation operation. While the device described hereafter handles the static spectrum content of sketch 141a, what is actually being stabilized is the spectrum sideband structure of a double sideband signal of sweeping carrier frequency or a pure two tone signal of swept means frequency shown as sketch 140a, to be precisely translated and maintained symmetrically displaced about and $fIF_3$ of 500K c.p.s. value. Hence the board application of this AFC technique as obtained without subsequent audio frequency shifting is directed to other measurement areas where at times double sideband or two tone type swept signals are required to undergo such stabilized frequency translation.

This applicability is also used in the priorly described Mode II AFC action.

The 4th IF amplifier stages 149b comprise cascaded IF amplifier A, 149A, IF amplifier B, 149B, and IF amplifier C, 149C having similar characteristics. Each of the three stages of amplification is set for a sufficient flat bandwidth region about $fIF_4$ with adequate skirt selectively to allow unattenuated passage of only the difference frequency products that develop and for their range of variation, while readily rejecting all other undesired components in mixer 141 outputs. The static spectrum output of 4th IF amplifier stages 149b feeds the input selective fixed resolving filter 149c, whose typical bandpass characteristic is shown at sketch 149a. Resolving filter 149c output, which is to be one static spectrum component term for one scan interval, is applied to detection and video amplification section 7 of FIG. 5a.

Now for internal AFC Mode I Systems test operation, portions of the static frequency translated spectrum at $fIF_4$ are further picked off at two separate locations in its direct signal path. One path, designated 0° path, connects from between stages IF amplifier A, 149A, and IF amplifier B, 149B. The other path is taken from the junction of IF amplifier B, 149B, and IF amplifier C, 149C stages and becomes the designated 180° path. This relationship becomes oppositely phased as note is made of the 180° phase reversal characteristic of the amplifier stage, IF amplifier B, 149B. The 0° path feeds to time delay network 161, while the 180° path is applied to attenuator 162. Since the static spectrum of 141a constitutes a modulated signal waveform in the time domain as shown by sketch 161a, time delay network 161 is set to compensate for the wave envelope time delay this signal experiences in its passage through IF amplifier B, 149B, and attenuator 162. Accordingly, attenuator 162 in the 180° path is set to compensate for this signal's amplitude increase due to the gain characteristic of IF amplifier B, 149B. Therefore, the outputs at time delay network 161 and attenuator 162, namely the IF waveform signals are of equal amplitude but of opposite phase characteristic.

The output of attenuator 162 feeds to input of limiter 164, while the time delay network 161 output is applied to limiter 163. Identical limiters 163 and 164 amplitude limit the two tone with intermodulation waveforms. This severe amplitude limiting results in a degree of clipping where only the zero crossings are retained and all envelope information indicative of amplitude modulation is destroyed. With the AM component removed only the PM (phase modulation) components remain, and waveform sketch 163a illustrates a typical example of the resultant phase modulated wave for the 0° path while the 180° path waveform is of opposite polarity.

Use is now made of a pair of factual heterodyne operations of which the general understanding may be found on pages 274 and 275 of the textbook, "Electronic Measurements" by F. Terman and J. Pettet, 2nd edition published 1952 by McGraw Hill Co.

First such heterodyne action occurs in the two channels, with the two heterodyne local oscillator voltages having identical phase resulting in a changing of frequency but with the original phase relations being preserved. The second action being made is such that frequency multiplication is in a form of adding a signal to itself "N" times with a subsequent increase in the phase modulation index, while for the straight forward heterodyneing (with the addition (or subtraction) of a signal with respect to another signal of different frequency) one obtains the frequency change with an unchanged index of phase modulation. Considering the nature of a two tone equal amplitude signal such as the sideband component and carrier signal relationships for the special case of $M,N=2$ given on pages 232 through and including 235 in "Pulses and Transients in Communications Circuits," by Colin Cherry, 1950, Dover Publications, Inc., the value of heretofore heterodyne theory is explained in a clearer context.

Accordingly, the phase modulated wave outputs of limiter 163 and 164 are applied as the signal inputs of similar balanced mixers 165 and 166 respectively. Balanced mixers 165 and 166 have a common local oscillator signal $f_{l.o.}$ supplied from the output of 600K c.p.s. bandpass amplifier 604a, whose input is fed from the wiper of MT and IM selector switch 604 of IF shifter 602 of FIG. 5b. For the moment assume switch 604 is in its center position to supply the 600K c.p.s. signal as the local oscillator signal $f_{l.o.}$ A similar heterodyning operation occurs at balanced mixers 165 and 166; whose outputs feed bandpass amplifiers 167 and 168 respectively, which have their design center frequency value at 500K c.p.s., and are of sufficiently wide and flat bandwidth to pass the difference frequency product translated phase modulated wave. Noting from the equitable relationship of carrier and sideband to that of a two tone signal; then let one tone represent the carrier, say $f_1$ and the remaining tone $f_2$ be referred to as the sideband tone, that in effect defines the modulating signal as the audio frequency difference of $(f_2-f_1) = (fSB-fC) = \Delta F$.

With reference to the graph of FIG. 100, the characteristics given on page 234 of the above mentioned published textbook by C. Cherry, the carrier phase modulation, or the phase modulation of lower main tone $f_1$, is accomplished by a sawtooth wave. Alternatively this may be considered in the reverse case, wherein the carrier now is tone $f_2$ and $f_1$ represents the sideband components; the phase modulation of this carrier is unchanged in sawtooth shape, but is of opposite sawtooth slope.

Assuming reference to $f_1$, then the frequency difference translation becomes $[f_{1.o.} - (f_1 \text{ phase modulated})]$. However while the existing component at $f_1$ would be usable with the properly offset local oscillator signal $f_{1.o.}$, in this preferred embodiment it is the mean frequency position location that is to serve in the following frequency phase comparison operation, or $$\left[ f_m = \frac{f_1 + f_2}{2} \right]$$

The polarity reversal is experienced by both PM wave inputs due to lower sideband or difference product selection at the heterodyne outputs.

Thus it becomes clear that with lower tone, say $f_1$, is of positive slope increasing by $\pi°/2$ amount at $$\left( f_1 + \frac{\Delta F}{2} \right)$$

and the higher tone, say $f_2$, is of negative slope and is decreased by $\pi°/2$ amount at $$\left( f_2 - \frac{\Delta F}{2} \right)$$

then at $f$ mid or mean frequency, $$f_m = \left( \frac{f_1 + f_2}{2} \right) = \left( f_1 + \frac{\Delta F}{2} \right) = \left( f_2 - \frac{\Delta F}{2} \right)$$

an 180 degree phase reversal occurs every $\Delta F$ interval.

The frequency translated pair of PM wave outputs from band pass filter 167 and 168 are respectively connected to contacts A and B of the single pole, double throw (SPDT) positions of diode gate switch and switch driver 169. The PM wave output of band pass filter 167 is further applied to detector 170 stage. It should be observed from waveform sketch 163a that detection of the phase modulated wave results in a detector 170 output signal waveform as shown by sketch 170a; producing sharply distinct zero level positions at $\Delta F$ c.p.s. intervals, where $\Delta F$ is the frequency difference between the main tones. Thus detected pulse output that has negative going peaks at the $\Delta F$ c.p.s. intervals where zero crossover occurs, is thereupon applied to the switch driver section, noted as point D of SPDT diode gate switch and switch driver 169. This periodic pulse signal (170a) serves as the trigger switching signal to effectively produce the alternation of the switch wiper between contact position A and B. Accordingly, in a periodic manner governed by the $\Delta F$ c.p.s. value, the zero ° PM waveform is passed while the 180° PM waveform is cut off; then at $\Delta F$ interval, the situation is reversed since the PM characteristic of the supplied waveforms has become inverted and here the 180° PM waveform reverts to the prior phase condition of the zero degrees PM waveform and is passed at the new switch position to the singular common output at C.

In effect the phase modulation with respect to the mean frequency signal location is negated and a continuous wave (CW unmodulated) signal output conversion develops having a frequency value equal to the mean instantaneous frequency of the two tone signal being applied through the error correcting feedback path of the closed loop operation, which possesses ($\pm \Delta_e$) error prior to phase lock taking place.

At common output C of switch 169, the translated mean frequency signal with error develops and is then applied to input of 500K c.p.s. bandpass amplifier 171. Although not shown, amplifier 171 output may be further applied prior to a limiter stage as is common practice in phase comparison to eliminate any amplitude error.

The resultant output of bandpass amplifier 171 is thus expressed as $[f \text{ means } (\pm) \Delta_e]$ where $f$ mean is the translated 500K c.p.s. mean frequency of spectrum sketch 141a. This feedback error signal is connected to contact III of AFC mode switch MS10 of FIG. 5a, which thereafter serves in the frequency-phase comparison, frequency correction and stabilization operation for the internal AFC. Mode I multi-frequency systems test performance by way of the present invention.

The frequency stabilization operation for position III has been described for the normal center position of MT and IM selector switch 604. Thereafter, operation of this switch results in the audio frequency shift M $\Delta F_s$ in one polarity direction for the spectrum content of sketch 141a, within the direct signal processing path, and a similar frequency shift of M $\Delta F_s$ of the same polarity direction for the local oscillator signal of $f_{1.o.}$ being supplied to like balanced mixer 165 and 166. This effectively results in negating the frequency shift experienced by the mean frequency value of sketch 141a by an equal and opposite shift of the common heterodyning operation for the difference frequency product output in the AFC feedback path. Thereby, the feedback error signal for frequency phase comparison remains of 500K c.p.s. ($\pm$) $\Delta_e$ value for each scan excursion selected in accordance with this present invention.

While a mode switch operation is illustrated and so described throughout this specification, as a standard practice in the art, electrically controlled relay contact operation may be substituted therefor as desired.

FIG. 6a repeats for reference purposes the FIG. 6 typical example case of my copending application with further clarifying notations. As shown this chart represents Mode I inter-modulation spectrum analysis operation as duplicated herein.

FIG. 6b is a typical chart of values useful for the Mode II operation for IM$_3$ plotting. The charts of FIGS. 6a and 6b become self-explanatory with the understanding of the signal processing description given in the specifications.

As an elementary example of fairly universal utilization of the composite test set of this invention it should be noted that a rapid response examination of a device under test may be made with the time varying $\Delta F$ relation of Mode IIa for 3rd and Mode IIb for 5th and thereafter subsequently a particular $\Delta F$ constant frequency response may be examined in detail by Mode I in accordance with the analysis technique introduced by my related copending application.

Whereas the technique of this invention is being shown integrated with the double sideband two tone type signal generation embodiment of my copending application, this basically powerful measurement tool is not limited thereto. By way of further example, the pure two tone signal generation embodiment illustrated in FIG. 7 of my copending application may also encompass the featured signal processing of this present invention in the following manner.

One tone frequency represented as $f_{1.o.}$ is removed from linear combining and the remaining $\Delta Fs$ offset tone frequency of the pure two tone pair remains as the local oscillator signal input to the RF drift-free modulator. The procedure thereafter operates much in the same manner as described earlier for the embodiment of FIGS. 1a and b.

It is to be observed that the block diagrams and circuit stages illustrated show only the functional elements that are necessary to implement and explain the operation of the technique of intermodulation spectra signature recording and that the practical instrument may contain more conventionally known features, depending upon its specific design and further intended applications.

The many advantages and unique features of this invention have become readily evident when considered and understood in light of the coaction and integration of the two application modes as described in detail hereinbefore to fulfill their most utilized purpose in serving as composite intermodulation spectra signature recorder.

In making graphical recording as in an automatic manner of X–Y plotting, the recognized need for close identification of a response point of interest is best met by the illustrated and described frequency synthesizer controlled test system embodiment given detailed herein. For CRT screen display operation, it is understood that at times a small departure from such precise plotting may be allowed and in some cases the basic signal processing introduced in accord with this invention may be brought about in an essentially similar manner by the use of separate stably constructed oscillators of both the fixed and the variable frequency type. Hence while the preferred embodiments set forth in this specification by way of example, have been presented; it is clear that further modification will become apparent to others skilled in the art. It is thereby not intended to have this invention limited only to the particular arrangements shown and described. It is, therefore, desired that such variations occurring be considered as following within the true spirit and scope of this invention as defined in the appended claims.

I claim:

1. A circuit arrangement for generating an asymmetric two frequency sweep signal wherein one frequency component of said two frequency signal is static and the other of said two frequency signal has its frequency varied with time to produce a linearly varying frequency difference between said two frequencies of said signal which comprises:
   a controlled variable oscillator having an output of frequency $f_1$,
   a linear sum combining network having a pair of inputs and one output, said output ($f_1$) of said controlled variable oscillator connected to one input of said linear sum combining network,
   a drift-free modulator means having as a part thereof two frequency converters with the said output $f_1$ applied to one input of one of said converters and the output of said one of said converters connected to one of the inputs of the other of said converters,
   a sideband filter having its output connected to other input of said one of said converters,
   a balanced modulator having its output connected to said sideband filter and having a carrier input and a signal input,
   a variable audio oscillator having an output frequency $\Delta F_s$, said $\Delta F_s$ being the quiescent frequency difference between said two frequencies of said signal,
   a fixed frequency oscillator having frequency output $f_{co}$, said audio oscillator and said fixed oscillator having their outputs connected to the signal input and the carrier input respectively of said balanced modulator,
   a voltage controlled variable oscillator having a quiescent output $f_{co}$, with said output frequency deviating therefrom dependent on the amplitude of a voltage applied thereto,
   a sawtooth waveform generator having its output connected to the input of said voltage controlled variable oscillator,
   said output of said voltage controlled variable oscillator connected to the other input of the said other of said converters,
   the output of said other of said converters connected to the other input of said linear sum combining network,
   whereby the output of said linear sum combining network is a pair of tone frequency signals, one being a static frequency signal $f_1$ and the other being a tone frequency signal linearly sweeping about a quiescent value that is ($f_1 \pm \Delta F_s$).

2. A composite signal generation system for selectably producing two frequency varying signal selectable to provide two symmetric tones swept with a constant frequency separation therebetween and an asymmetric tone with linearly varying frequency separation which comprises:
   a controlled variable oscillator having an output frequency $f_1$,
   a linear sum combining network having a pair of inputs and one output, said output ($f_1$) of said controlled variable oscillator connected to one input of said linear sum combining network,
   a drift-free modulator means having as a part thereof two frequency converters with the said output $f_1$ applied to one input of one of said converters and the output of said one of said converters connected to one of the inputs of the other of said converters,
   a single pole double throw switch having a movable arm connected to other of said inputs of said one of said converter, and a pair of stationary contacts, a sideband filter having its output connected to one contact of said switch,
   a balanced modulator having its output connected to both said sideband filter and the other contact of said switch,
   a variable audio oscillator having an output frequency $\Delta F_s$, said $\Delta F_s$ being the quiescent frequency difference between said two frequencies of said signal,
   a fixed frequency oscillator having an output frequency $f_{co}$, said audio oscillator and said fixed oscillator having their output connected to the signal input and the carrier input respectively of said balanced modulator,
   a voltage controlled variable oscillator having a quiescent output $f_{co}$, with said output frequency deviating therefrom dependent on the amplitude of a voltage applied thereto,
   a sawtooth waveform generator having its output connected to the input of said voltage controlled variable oscillator,
   said output of said voltage controlled variable oscillator connected to the other input of the said other of said converters,
   a second single pole double throw switch having movable pole connected to an output terminal and a pair of stationary contacts,
   the output of said other of said converters and the other input of said linear sum combining network both connected to one of said pair of contacts of said switch,
   the output of said linear sum combining network connected to the other contact of said second switch, whereby a selectable pair of outputs are obtained at said output terminal, by gauging said switches one selected output being two sweeping tone frequencies of quiescent mean frequency value $f_1$ and of constant frequency difference $\Delta F_s$; the other selected output being a static frequency signal $f_1$ and a sweeping tone frequency signal which is linearly swept about a quiescent value ($f_1 \pm \Delta F_s$).

3. The composite signal generation system according to claim 2 further including a signal attenuator electrically disposed between said output terminal and said movable pole of said second switch.

4. A method of generating a frequency swept asymmetric two tone signal with one tone static and the other tone linearly varying with time which comprises the steps of:
   generating a selectable static tone frequency,
   generating a carrier frequency, selectably generating a fixed audio frequency, and a swept frequency, mixing said audio frequency and said carrier frequency to produce the sum and difference sideband frequencies thereof, filtering selectively the sum and the difference sideband frequency as a local oscillator signal, frequency converting the said static tone and the said local oscillator signal to produce the sum frequency of the combination thereof, selectively generating a swept frequency signal about a quiescent frequency value equal to value of said local oscillator signal, and a quiescent frequency signal, frequency converting said sum frequency signal and said swept frequency signal to produce the swept difference frequency signal thereof, linearly sum combining said static tone frequency and said swept difference frequency, to thereby generate a frequency swept asymmetric two tone signal.

5. A circuit arrangement for ascertaining the distortion of a system under test wherein frequency swept two tone signal asymmetrically composed of a static tone and a swept tone linearly varying with time is applied as an input to said system which comprises:

a first frequency converter means for translating the output of said system under test to locate said static tone at a first intermediate frequency value, generator means for generating a frequency disposed from said first intermediate frequency by a frequency equal to a second intermediate frequency value, sweep scan means for varying said generated frequency in synchronization with said swept tone of said asymmetric swept two tone signal per scan cycle, offset means for frequency offsetting said generated frequency by an amount equal to the quiescent frequency separation value of said asymmetric two tone signal and by twice thereof on a succeeding scan cycle, a second frequency converter means having a mixer for receiving said first intermediate frequency sweep signal and said generated frequency offset sweep signal and having therein means for the negating of the frequency sweep of the distortion signal adjacent to said static tone frequency and a sweep at twice the frequency of said distortion signal, selected filter means for passing only said distortion term, connected at said second frequency converter output and passing a difference frequency signal of said second intermediate frequency value, amplitude detection means connected to receive said difference frequency output of said selective filter, a recording plotting-means having a pair of orthogonal plotting inputs, having one of said plotting inputs connected to receive the output of said amplitude detection means, synchronous generator-means for generating a signal amplitude synchronized with said sweep frequency of said two tone signal connected to the other of said plotting inputs whereby said plotting means will produce thereon a representative plot of the distortion amplitude versus frequency of said system under test automatically.

6. The circuit arrangement according to claim 5 wherein said first frequency converter means comprises:

a mixer having two inputs and one output and connected to receive at one input said asymmetric swept two tone signal after said signal passes through said system under test, a variable frequency voltage controlled oscillator connected to other input of said mixer and supplying local oscillator signal of frequency value displaced higher in frequency by said first intermediate frequency above the frequency value of said fixed tone, a first intermediate frequency amplifier connected to the output of said mixer, and passing only the difference frequency swept signals, a second intermediate frequency amplifier connected to the output of said first intermediate frequency amplifier and connected to receive an output therefrom, a source of reference frequency identical to the frequency of first intermediate frequency, a frequency/phase comparator, comprising a frequency discriminator having a center frequency equal to said source of reference and a phase detector connected to receive said reference frequency as one of its two inputs, the output of said second intermediate frequency amplifier connected to the input of said frequency discriminator and to the other input of said phase detector said second first IF amplifier, said IF amplifier output being the one input to said frequency discriminator and the other input to said phase detector, a dual low pass frequency filter connected to receive independently the outputs of said frequency/phase comparator where the error voltages generated by said comparator are proportional to frequency error between said reference frequency values and frequency translated static tone of said difference frequency sweep signal, the output of said low pass filter connected to the voltage sensitive element of said voltage controlled oscillator whereby said frequency translated static tone is exactly positioned and stabilized at the said first intermediate frequency value.

7. A method for recording the intermodulation spectra signature of a system under test which comprises the steps of:

generating a selectable pair of swept two tone signals having a linearly varying frequency separation about a quiescent frequency separation value therebetween, applying said swept tone signals to said system under test, frequency translating the output response of said system under test to a symmetrical sweep about a first intermediate frequency, generating a sweep frequency signal synchronized with the sweep of said selectable pair of swept two tone signals, said sweep frequency signal have a quiescent center frequency displaced from said first intermediate frequency by an amount equal to a second intermediate frequency value, frequency offsetting said center frequency by a selectable amount equal to one half of said frequency separation value, and odd multiple factors thereof, mixing said first intermediate frequency sweep signal and said frequency offset sweep frequency signal, wherein said mixing eliminates the frequency deviation of said first intermediate frequency sweep signal, filtering the output of said mixing to pass only the single fixed difference frequency signal of said second intermediate frequency value, detecting the filtered output, plotting said filtered output in synchronization with said selectable swept two tone signal, whereby one scan cycle plots the system under tests amplitude response to one tone of said selectable swept two tone signal, and the succeeding scan cycles selectably plot a pattern of curves representative of the distortion characteristic of the system under test developed over a portion of its bandwidth, varying the signal level of said selectable swept two tone signal said being applied and monitoring said signal level.

8. A method for automatically ascertaining the distortion components of a system under test which comprises:

generating an asymmetric frequency swept two tone signal with one tone frequency static and the other tone frequency linearly varying as a sweep frequency, applying said asymmetric swept two tone signal to said system under test, frequency translating the test response output of said system under test to locate the said static tone at a first intermediate frequency value, generating a sweep frequency signal synchronized with the sweep of said varying tone frequency, said sweep frequency signal being about a center quiescent frequency displaced from said first intermediate frequency by an amount equal to a second intermediate frequency value, selectably frequency offsetting said center frequency by an amount equal to the quiescent frequency separation value of said asymmetric two tone signal, and by twice the said amount on a succeeding scan cycle, mixing said first intermediate frequency sweep signal and said frequency offset sweep frequency signal, cancelling the frequency deviation of the distortion term adjacent to said static tone frequency and twice said amount frequency offsetting on a subsequent scan cycle, filtering the output of said mixing to pass only the fixed difference frequency signal of said second intermediate frequency, detecting the filtered output, plotting the said filtered output in synchronization with said swept two tone signal, whereby one scan cycle plots the amplitude response of the said most adjacent distortion term and a succeeding scan cycle plots the amplitude response of the said most adjacent distortion component to said most adjacent distortion term.

References Cited

UNITED STATES PATENTS

| | | | |
|---|---|---|---|
| 2,635,183 | 4/1953 | Smith et al. | 325—133 |
| 2,808,562 | 10/1957 | French et al. | 324—57 |
| 2,903,693 | 9/1959 | Ley | 325—65 X |
| 3,149,289 | 9/1964 | Moss | 331—38 |

RALPH D. BLAKESLEE, Primary Examiner

BENEDICT V. SAFOUREK, Assistant Examiner

U.S. Cl. X.R.

324—57; 325—133; 331—38, 178